(12) United States Patent
Filatov

(10) Patent No.: US 8,169,118 B2
(45) Date of Patent: May 1, 2012

(54) HIGH-ASPECT-RATIO HOMOPOLAR MAGNETIC ACTUATOR

(75) Inventor: Alexei V. Filatov, Fullerton, CA (US)

(73) Assignee: Calnetix Technologies, L.L.C., Yorba Linda, CA (US)

( * ) Notice: Subject to any disclaimer, the term of this patent is extended or adjusted under 35 U.S.C. 154(b) by 147 days.

(21) Appl. No.: 12/569,559

(22) Filed: Sep. 29, 2009

(65) Prior Publication Data

US 2010/0090556 A1 Apr. 15, 2010

Related U.S. Application Data

(60) Provisional application No. 61/104,215, filed on Oct. 9, 2008.

(51) Int. Cl.
*H02K 31/00* (2006.01)
*H02K 7/09* (2006.01)

(52) U.S. Cl. .................. 310/178; 310/90.5; 310/181

(58) Field of Classification Search .............. 310/90.5, 310/178, 179, 181, 190, 191, 112; H02K 7/09, H02K 31/00
See application file for complete search history.

(56) References Cited

U.S. PATENT DOCUMENTS

| | | | | |
|---|---|---|---|---|
| 1,916,256 A | * | 7/1933 | Chandeysson | 310/178 |
| 2,276,695 A | | 3/1942 | Lavarello | |
| 2,345,835 A | * | 4/1944 | Serduke | 310/219 |
| 2,409,857 A | | 10/1946 | Hines et al. | |
| 2,917,636 A | | 12/1959 | Akeley | |
| 3,060,335 A | | 10/1962 | Greenwald | |
| 3,064,942 A | | 11/1962 | Martin | |
| 3,439,201 A | | 4/1969 | Levy et al. | |
| 3,943,443 A | | 3/1976 | Kimura et al. | |
| 4,127,786 A | | 11/1978 | Volkrodt | |
| 4,170,435 A | | 10/1979 | Swearingen | |
| 4,260,914 A | | 4/1981 | Hertrich | |
| 4,358,697 A | | 11/1982 | Liu et al. | |

(Continued)

FOREIGN PATENT DOCUMENTS

DE 102006004836 A1 5/2007

(Continued)

OTHER PUBLICATIONS

McMullen, Patrick T., et al., "*Combination Radial-Axial Magnetic Bearing*," Seventh International Symp. On Magnetic Bearings, Aug. 23-25, 2000, ETH Zurich, pp. 473-478.

(Continued)

*Primary Examiner* — Quyen Leung
*Assistant Examiner* — Thomas Truong
(74) *Attorney, Agent, or Firm* — Fish & Richardson P.C.

(57) ABSTRACT

A homopolar magnetic actuator is configured to exert controllable radial forces on a body adapted to rotate around an axis. The actuator comprises at least three radial magnetic pole assemblies distributed at some distances from each other along the axis, each including a plurality of poles adjacent to an actuator target on the body. Permanent magnets are used to induce bias magnetic fluxes in the assemblies with polarities alternating from assembly to assembly but remaining the same around the rotational axis. Having several small bias fluxes distributed between several pole assemblies instead of a large single bias flux facilitates designing an actuator with a high aspect ratio. A control coil around each pole can induce a control magnetic flux in the poles. These control fluxes affect magnetic flux distribution around the actuator target, resulting in magnetic forces exerted on the target.

20 Claims, 16 Drawing Sheets

U.S. PATENT DOCUMENTS

| | | | |
|---|---|---|---|
| 4,362,020 A | 12/1982 | Meacher et al. | |
| 4,415,024 A | 11/1983 | Baker | |
| 4,635,712 A | 1/1987 | Baker et al. | |
| 4,659,969 A | 4/1987 | Stupak | |
| 4,740,711 A | 4/1988 | Sato et al. | |
| 5,003,211 A | 3/1991 | Groom | |
| 5,083,040 A | 1/1992 | Whitford et al. | |
| 5,241,425 A | 8/1993 | Sakamoto et al. | |
| 5,315,197 A | 5/1994 | Meeks et al. | |
| 5,481,145 A | 1/1996 | Canders et al. | |
| 5,514,924 A | 5/1996 | McMullen et al. | |
| 5,559,379 A | 9/1996 | Voss | |
| 5,589,262 A | 12/1996 | Kiuchi et al. | |
| 5,627,420 A | 5/1997 | Rinker et al. | |
| 5,672,047 A | 9/1997 | Birkholz | |
| 5,739,606 A * | 4/1998 | Takahata et al. | 310/90.5 |
| 5,767,597 A | 6/1998 | Gondhalekar | |
| 5,942,829 A | 8/1999 | Huynh | |
| 5,994,804 A | 11/1999 | Grennan et al. | |
| 6,087,744 A | 7/2000 | Glauning | |
| 6,130,494 A | 10/2000 | Schöb | |
| 6,148,967 A | 11/2000 | Huynh | |
| 6,167,703 B1 | 1/2001 | Rumez et al. | |
| 6,191,511 B1 | 2/2001 | Zysset | |
| 6,268,673 B1 * | 7/2001 | Shah et al. | 310/90.5 |
| 6,270,309 B1 | 8/2001 | Ghetzler et al. | |
| 6,304,015 B1 | 10/2001 | Filatov et al. | |
| 6,313,555 B1 * | 11/2001 | Blumenstock et al. | 310/90.5 |
| 6,325,142 B1 | 12/2001 | Bosley et al. | |
| 6,359,357 B1 * | 3/2002 | Blumenstock | 310/90.5 |
| 6,437,468 B2 | 8/2002 | Stahl et al. | |
| 6,465,924 B1 | 10/2002 | Maejima | |
| 6,664,680 B1 | 12/2003 | Gabrys | |
| 6,700,258 B2 | 3/2004 | McMullen et al. | |
| 6,727,617 B2 | 4/2004 | McMullen et al. | |
| 6,794,780 B2 | 9/2004 | Silber et al. | |
| 6,856,062 B2 | 2/2005 | Heiberger et al. | |
| 6,876,194 B2 | 4/2005 | Lin et al. | |
| 6,885,121 B2 * | 4/2005 | Okada et al. | 310/90.5 |
| 6,897,587 B1 | 5/2005 | McMullen et al. | |
| 6,925,893 B2 | 8/2005 | Abe et al. | |
| 6,933,644 B2 * | 8/2005 | Kanebako | 310/90.5 |
| 7,042,118 B2 | 5/2006 | McMullen et al. | |
| 7,557,480 B2 | 7/2009 | Filatov | |
| 2001/0030471 A1 * | 10/2001 | Kanebako | 310/12 |
| 2005/0093391 A1 | 5/2005 | McMullen et al. | |
| 2007/0056285 A1 | 3/2007 | Brewington | |
| 2007/0063594 A1 | 3/2007 | Huynh | |
| 2007/0164627 A1 * | 7/2007 | Brunet et al. | 310/90.5 |
| 2007/0200438 A1 | 8/2007 | Kaminski et al. | |
| 2007/0296294 A1 | 12/2007 | Nobe et al. | |
| 2008/0211355 A1 | 9/2008 | Sakamoto et al. | |
| 2008/0246373 A1 | 10/2008 | Filatov | |
| 2008/0252078 A1 | 10/2008 | Myers et al. | |
| 2009/0004032 A1 | 1/2009 | Kaupert | |
| 2009/0201111 A1 | 8/2009 | Filatov | |
| 2010/0117627 A1 | 5/2010 | Filatov | |
| 2010/0301840 A1 | 12/2010 | Filatov | |
| 2011/0101905 A1 | 5/2011 | Filatov | |
| 2011/0163622 A1 | 7/2011 | Filatov et al. | |

FOREIGN PATENT DOCUMENTS

| | | |
|---|---|---|
| EP | 0 774 824 | 5/1997 |
| EP | 1905948 | 4/2008 |
| GB | 2225813 | 6/1990 |
| JP | 63277443 | 11/1988 |
| JP | 2006136062 A * | 5/2006 |

OTHER PUBLICATIONS

International Search Report and Written Opinion of the International Searching Authority issued in international application No. PCT/US2009/058816, mailed Jun. 10, 2010, 10 pages.

International Preliminary Report on Patentability issued in international application No. PCT/US2009/058816, mailed Apr. 12, 2011, 5 pages.

U.S. Appl. No. 13/116,991, filed May 26, 2011, Filatov.

U.S. Appl. No. 13/045,379, filed Mar. 10, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Turboden—Applications, "Turboden High Efficiency Rankine for Renewable Energy and Heat Recovery," (1 page), available at http://www.turboden.it/appiications_detail_ asp?titolo=Heat+recovery, 1999-2003, printed Jul. 27, 2006.

Honeywell, "Genetron®245fa Applications Development Guide," (15 pages), 2000.

Hawkins, Lawrence A. et al., "Analysis and Testing of a Magnetic Bearing Energy Storage Flywheel with Gain-Scheduled, Mimo Control," Proceedings of ASME Turboexpo 2000, Munich, Germany, May 8-11, 2000, pp. 1-8.

McMullen, Patrick T. et al., "Combination Radial-Axial Magnetic Bearing," Seventh International Symposium on Magnetic Bearings, ETH Zurich, Aug. 23-25, 2000, pp. 473-478.

Hawkins, Lawrence et al., "Shock and Vibration Testing of an AMB Supported Energy Storage Flywheel," 8th International Symposium on Magnetic Bearings, Mito, Japan, Aug. 26-28, 2002, 6 pages.

McMullen, Patrick T. et al., "Design and Development of a 100 KW Energy Storage Flywheel for UPS and Power Conditioning Applications," 24th International PCIM Conference, Nuremberg, Germany, May 20-22, 2003, 6 pages.

Hawkins, Larry et al., "Development of an AMB Energy Storage Flywheel for Industrial Applications," 7th International Symposium on Magnetic Suspension Technology, Fukoka, Japan, Oct. 2003, 5 pages.

Freepower FP6,. "Freepower FP6 Specification & Dimensions for 6kWe Electricity Generating Equipment," (2 pages), 2000-2004, printed Jul. 26, 2006.

Hawkins, Larry et al., "Development of an AMB Energy Storage Flywheel for Commercial Application," International Symposium on Magnetic Suspension Technology, Dresden, Germany, Sep. 2005, 5 pages.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.frepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60," (1 page), available at http://www.freepower.co.uk/fp6.htm, 2000-2006, printed Jul. 26, 2006.

Freepower ORC Electricity Company Products Technical Overview "A System Overview," (1 page), available at http://www.freepower.co.uk/tech-overview.htm, 2000-2006, printed Jul. 26, 2006.

Freepower ORC Electricity Company with Landfill Flarestacks, Flarestacks (Landfill & Petrochemical), (1 page) available at http://www.freepower.co.uk/site-2.htm , 2000-2006, printed Jul. 26, 2006.

Huynh, Co et al., "Flywheel Energy Storage System for Naval Applications," GT 2006-90270, Proceedings of GT 2006 ASME Turbo Expo 2006: Power for Land, Sea & Air, Barcelona, Spain, May 8-11, 2006, pp. 1-9.

Freepower ORC Electricity Company Home p., "Welcome to Freepower," (1 page) available at http://www.freepower.co.uk/, Jul. 18, 2006.

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

Ormat Web Site: "Recovered Energy Generation in the Cement Industry," (2 pages) available at http://www.ormat.com/technology_cement_2.htm, printed Jul. 26, 2006.

McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.

International Search Report and Written Opinion of the International Searching Authority issued in International Application No. PCT/US2009/031837 on Sep. 7, 2009; 11 pages.

International Preliminary Report on Patentability issued in International Application No. PCT/US2009/031837 on Jul. 27, 2010, 6 pages.

Meeks, Crawford, "*Development of a Compact, Lightweight Magnetic Bearing*," 26$^{th}$ Annual AIAA/SAE/ASME/ASEE Joint Propulsion Conference, Jul. 16-18, 1990, 9 pages.

Ehmann et al., "*Comparison of Active Magnetic Bearings With and Without Permanent Magnet Bias*," Ninth International Symposium on Magnetic Bearings, Lexington, Kentucky, Aug. 3-6, 2004, 6 pages.

Office Action issued in U.S. Appl. No. 12/267,517 on Mar. 28, 2011, 9 pages.

Notice of Allowance issued in U.S. Appl. No. 12/358,172 on Sep. 20, 2011, 10 pages.

\* cited by examiner

HIGH-ASPECT-RATIO HOMOPOLAR MAGNETIC ACTUATOR

CLAIM OF PRIORITY

This disclosure claims priority under 35 U.S.C. §119 to U.S. Provisional Patent Application Ser. No. 61/104,215, filed Oct. 9, 2008, the entire contents of which are hereby incorporated by reference.

BACKGROUND

This disclosure is directed to homopolar magnetic actuators. Actuators for active magnetic bearings (AMBs) can be divided into two broad categories: heteropolar and homopolar. The division is based on the polarities of magnetic poles placed around the rotor: if in the absence of the radial loading the magnetic polarity stays the same all the way around the rotor at any given axial position, then the actuator is called homopolar; otherwise, it is heteropolar. Homopolar magnetic actuators have several important advantages over heteropolar actuators, including low rotational losses and ease of using permanent magnets to generate a portion of the total magnetic field needed to support the rotor, thus reducing power consumption, number of terminal wires, and the actuator negative stiffness. However, they exhibit a relatively small aspect ratio which cannot be changed much at the design stage. The latter drawback often complicates integration of homopolar radial magnetic actuators into machines where the aspect ratio of the available envelope cannot be changed easily. In contrast, the aspect ratio of the heteropolar radial magnetic actuator can be easily adjusted at the design stage.

SUMMARY

An electromagnetic actuator may include a body having a rotational axis and at least three radial magnetic pole assemblies, each circumferentially arranged around the rotational axis, separated therefrom by radial gaps, and distributed along the rotational axis at fixed distances from each other. Each radial magnetic pole assembly may include a plurality of radial poles adjacent and spaced apart from a lateral facing surface of the body and can be configured to communicate magnetic flux with the lateral facing surface of the body. The body and the plurality of radial poles of each radial magnetic pole assembly may be magnetically coupled to each other and define a radial magnetic control circuit. Further, an excitation coil around each of the plurality of radial poles can be configured to produce control magnetic flux in the radial magnetic control circuits. A plurality of magnetic elements is distributed with alternating polarities along the rotational axis, each of which can reside between adjacent radial magnetic pole assemblies. The plurality of magnetic elements can be configured to produce bias magnetic flux flowing radially within each radial magnetic pole assembly and axially in the body between adjacent radial magnetic pole assemblies. In some instances, the magnetic elements may be permanent magnets.

A method for exerting a radial force on a body configured to rotate about a rotational axis can involve communicating a first bias magnetic flux between a first radial pole assembly, the body, and a second radial pole assembly, the first radial pole assembly adjacent the second radial pole assembly. The first and second radial pole assemblies may be spaced apart from one another along the rotational axis, each of the first and second radial pole assemblies being circumferentially arranged around the rotational axis, and separated from the body by an air gap. The first magnetic bias flux may propagate through the body in a direction parallel to the rotational axis. The method may further include communicating a second bias magnetic flux between the second radial pole assembly, the body, and a third radial pole assembly. The second and third radial pole assemblies may be spaced apart from one another along the rotational axis. The second and third radial pole assemblies may each be circumferentially arranged around the rotational axis and may be separated from the body by an air gap. The second bias magnetic flux may propagate through the body in a direction parallel to the rotational axis and opposite from the first bias magnetic flux. In addition, the method can include communicating a first radial control magnetic flux between the first radial pole assembly and the body, where the first radial control magnetic flux can propagate between a first radial pole of the first pole assembly, the body, and a second pole of the first pole assembly, and the first radial control magnetic flux can propagate in a radial direction orthogonal to the rotational axis. The method can also include communicating a second radial control magnetic flux between the second radial pole assembly and the body, the second radial control magnetic flux propagating between a first radial pole of the second pole assembly, the body, and a second pole of the second pole assembly. The second radial control magnetic flux can propagate in a radial direction orthogonal to the rotational axis and opposite from the first radial control magnetic flux. The method can additionally include communicating a third radial control magnetic flux between the third radial pole assembly and the body. The third radial control magnetic flux may propagate between a first radial pole of the third pole assembly, the body, and a second pole of the third pole assembly. The third radial control magnetic flux may propagate in a radial direction orthogonal to the rotational axis opposite from the second radial control magnetic flux.

An electric machine system can include a body having a rotational axis configured to move relative to a base. The system can also include an electromagnetic actuator subassembly coupled to the base that may include three radial pole assemblies, each circumferentially arranged around the rotational axis, separated from the body by radial gaps, and distributed along the rotational axis at fixed distances from each other. Each radial magnetic pole assembly may include a plurality of radial poles adjacent a lateral facing surface of the body and may be adapted to communicate magnetic flux with the lateral facing surface of the body. The body and the plurality of radial poles within each pole assembly may be magnetically coupled and define a plurality of radial magnetic control circuits. The plurality of radial poles may be adapted to communicate magnetic fluxes with the lateral facing surface of the body. A control coil may be around each of the radial poles and configured to produce control magnetic flux in the radial magnetic control circuits. A plurality of magnetic elements may be distributed with alternating polarities along the rotational axis, each of which can reside between adjacent radial magnetic pole assemblies. The magnetic elements may be configured to produce bias magnetic fluxes flowing radially within each radial magnetic pole assembly and axially in the body between adjacent radial magnetic pole assemblies. The system may have one or more position sensors configured to sense the position of the body, and may also include at least one control electronics package configured to control the magnetic flux in the radial magnetic control circuits.

In instances, the electromagnetic actuator may include first and second end radial magnetic pole assemblies, each residing at opposite ends of the electromagnetic actuator. The actuator may also include a first end pole circumferentially arranged around the rotational axis, separated from the body by radial gaps and adjacent the first end radial magnetic pole assembly that may be configured to produce bias magnetic flux flowing radially within the first end pole in a direction opposite to the bias magnetic flux in the first end radial magnetic pole assembly. A second end pole circumferentially arranged around the rotational axis may be separated from the body by radial gaps and adjacent the second end radial magnetic pole assembly. A second end magnetic element may be configured to produce bias magnetic flux flowing radially within the second end pole in a direction opposite to the bias magnetic flux in the second end radial magnetic pole assembly.

In instances, the actuator body may include a low reluctance target, the target adapted to communicate magnetic flux. In instances, the control magnetic flux is changed in response to a controllable current. The control magnetic flux can be adjusted to affect a total flux in the radial air gaps. The excitation coil around each of the plurality of radial poles may be energizable with a control current to produce distinct control fluxes in each of the radial magnetic control circuits of the respective radial magnetic pole assemblies.

In embodiments, the actuator can communicate a first, second, and third radial control magnetic flux by energizing control coils around radial poles of the first, second, and third radial pole assemblies with control currents. Varying the control current can affect a total magnetic flux distribution in the air gaps between the first, second, and third radial pole assemblies and the body. In some embodiments, the electric machine system has a body that may be coupled to a driven load, the driven load comprising at least one of a flywheel, a compressor, a generator, or an expander. The body may be coupled to a driver, where the driver may include at least one of a motor, an engine, or a turbine. In some instances, the body may be a rotor and the base may be a stator of an electric machine. In embodiments, the electronic control package may be configured to control the magnetic flux in the radial magnetic control circuits by energizing the control coil around each of the plurality of radial poles with a control current. The electronic control package may further be configured to energize the control coils around each of the plurality of radial poles with a control current to produce distinct control fluxes in the radial magnetic control circuits of the respective radial magnetic pole assemblies.

DETAILED DESCRIPTION

Figure 1A:
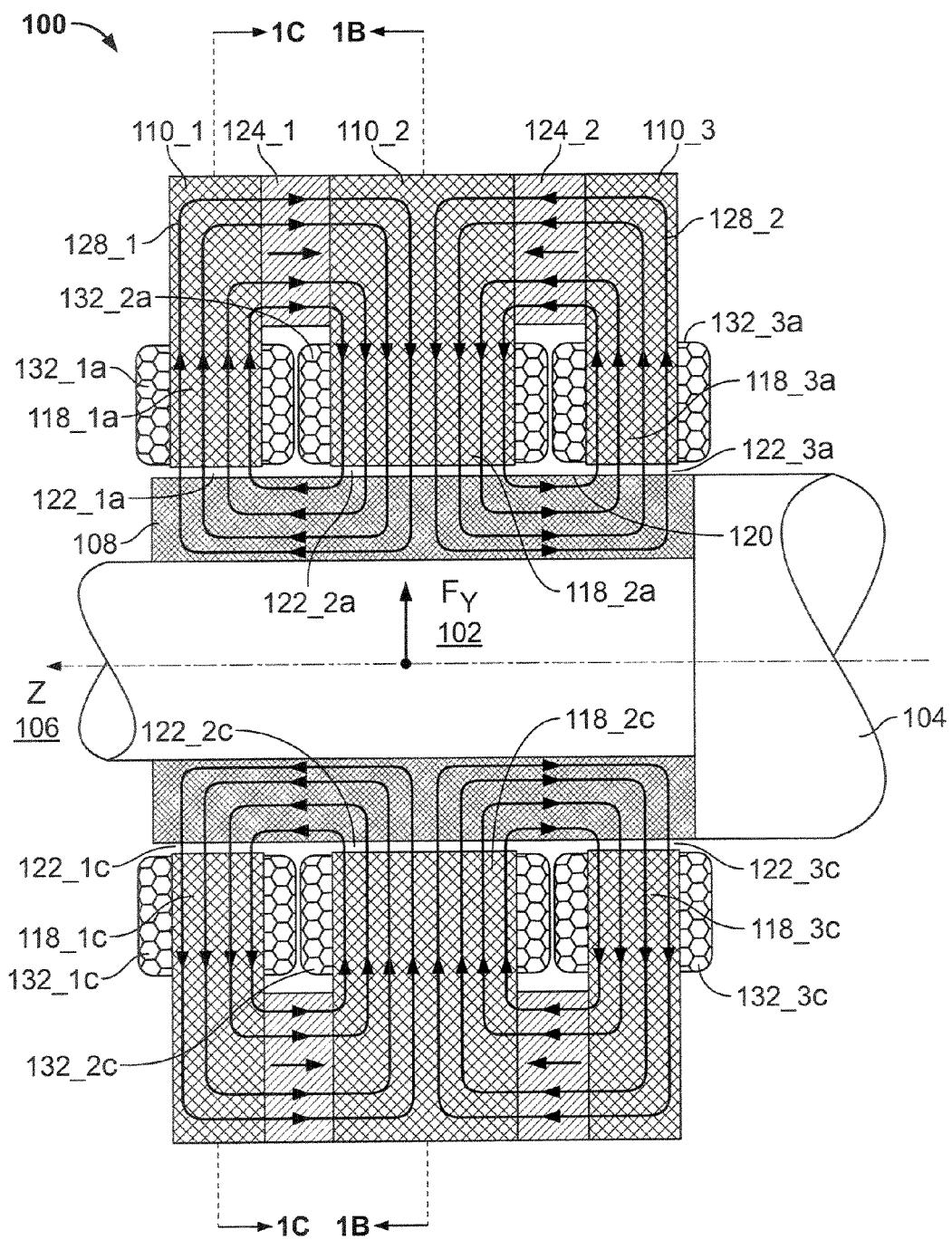
FIG. 1A is a side cross-sectional schematic of an embodiment of the high-aspect-ratio homopolar actuator.
Figure 1B:
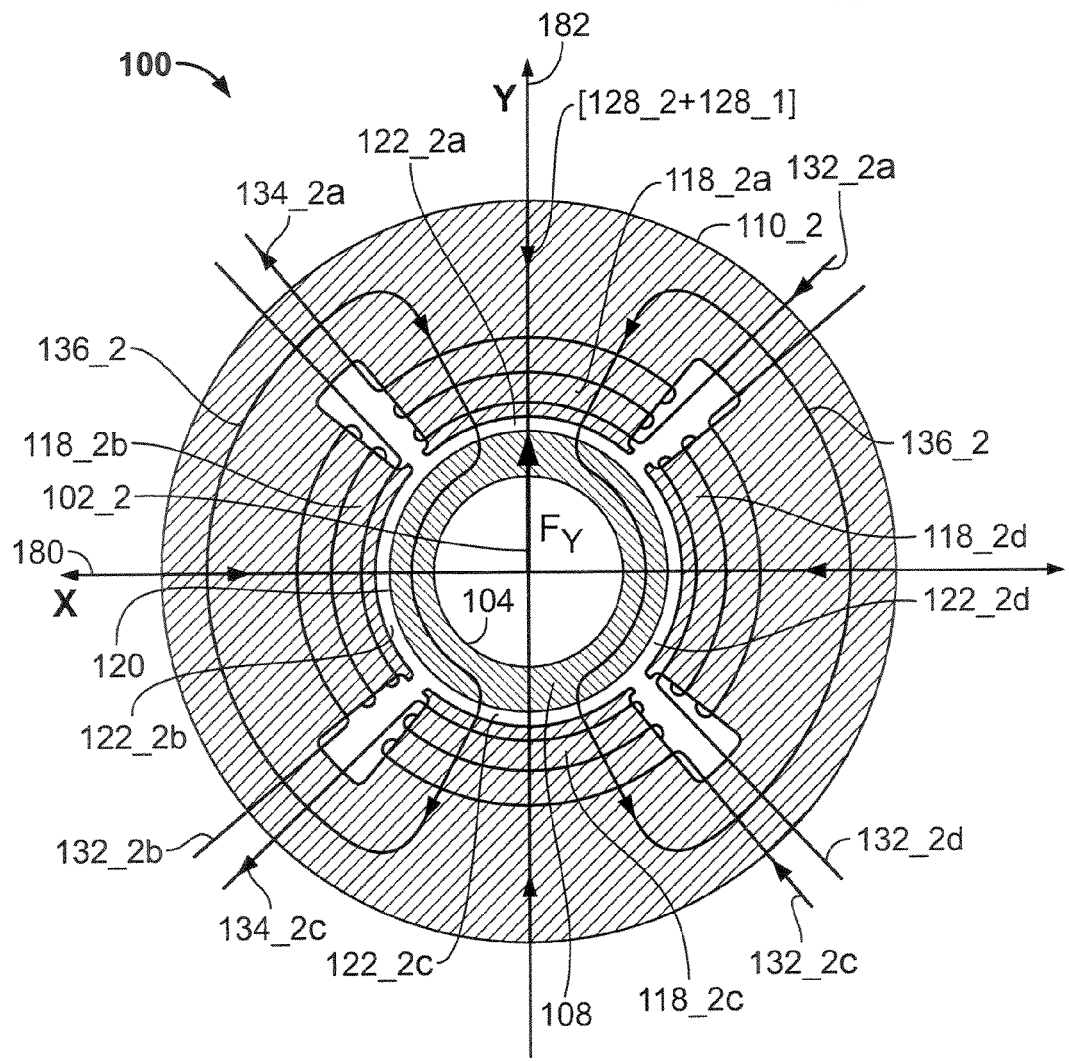
FIG. 1B is an axial cross-sectional schematic of the high-aspect-ratio homopolar actuator of FIG. 1A taken along view 1B-1B.

FIG. 1A is a side cross-sectional schematic of an embodiment of a high-aspect-ratio homopolar actuator 100 that serves to exert controllable radial forces 102 on a body 104 having a rotational axis Z 106 and including an actuator target 108. The actuator may include three radial magnetic pole assemblies 110_1, 110_2, and 110_3 distributed along the rotational axis 106 at some distances from each other. Each radial magnetic pole assembly includes a plurality of radial poles adjacent the lateral facing surface 120 of the body 104 and separated from it by radial gaps. For example, FIG. 1B shows that the radial magnetic pole assembly 110_2 includes a plurality of radial poles 118_2a through 118_2d adjacent the lateral facing surface 120 of the body 104 and separated from it by radial gaps 122_2a through 122_2d. Radial magnetic poles 118_2a through 118_2d are adapted to communicate magnetic fluxes with the lateral facing surface 120 of the body 104 through radial gaps 122_2a-122_2d. The body 104 (more specifically the actuator target 108) and the plurality of radial poles 118_2a through 118_2d within the pole assembly 110_2 are magnetically coupled and define a plurality of radial magnetic control circuits.

Figure 1C:
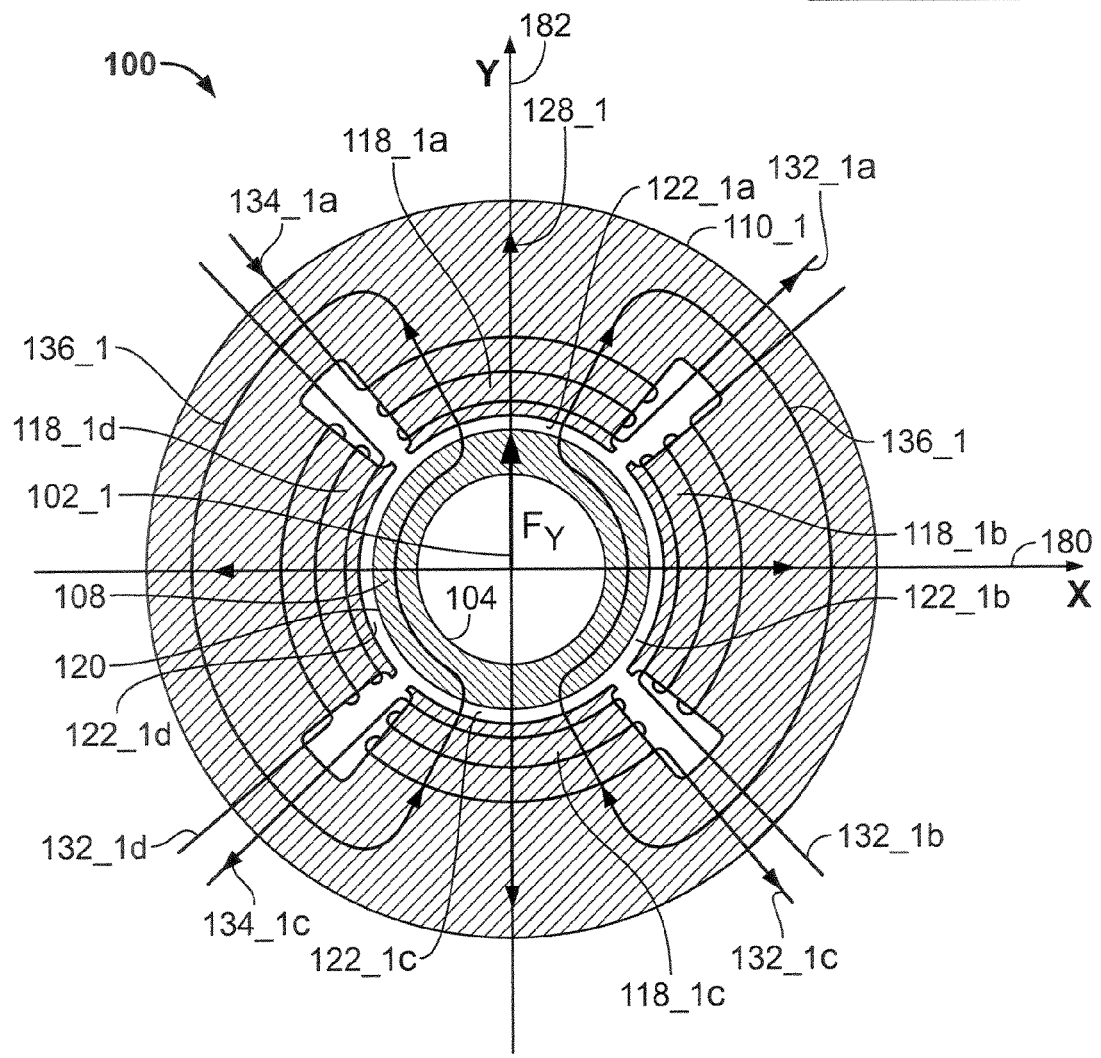
FIG. 1C is an axial cross-sectional schematic of the high-aspect-ratio homopolar actuator for FIG. 1A taken along view 1C-1C.

Similarly, FIG. 1C, which is an axial cross-sectional schematic of the high-aspect-ratio homopolar actuator for FIG. 1A taken along view 1C-1C, shows that the radial magnetic pole assembly 110_1 has four radial magnetic poles 118_1a through 118_1d adjacent the lateral facing surface 120 of the body 104 and separated from it by radial gaps 122_1a through 122_1d.

Axially magnetized permanent magnets 124_1 and 124_2 installed between the radial magnetic pole assemblies 110_1, 110_2 and 110_3 can induce bias magnetic fluxes 128_1 and 128_2 flowing radially within each radial magnetic pole assembly and axially within the actuator target 108, which is a part of the body 104, between any two neighboring radial magnetic pole assemblies so that directions of radial bias magnetic fluxes within radial magnetic pole assemblies and directions of the axial magnetic fluxes between neighboring radial magnetic pole assemblies alternate in the axial direction. Magnets 124_1 and 124_2 may be, for example, neodymium iron boron magnets or samarium cobalt magnets, though are not limited as such. Magnets 124_1 and 124_2 may be axially magnetized permanent magnets or radially magnetized permanent magnets. More specifically, the bias flux 128_1 induced by the magnet 124_1 flows radially outwards in the radial magnetic pole assembly 110_1, radially inwards in the magnetic pole assembly 110_2, and axially in the positive Z direction when flowing from the radial magnetic pole assembly 110_2 to the radial magnetic pole assembly 110_1 within the actuator target 108. The bias flux 128_2 induced by the magnet 124_2 flows radially outwards in the radial magnetic pole assembly 110_3, radially inwards in the magnetic pole 110_2, and axially in the negative Z direction when flowing from the radial magnetic pole assembly 110_2 to the radial magnetic pole assembly 110_3 within the actuator target 108. Note that directions of the axial bias fluxes within the actuator target 108 alternate along the rotational axis: the bias flux 128_1 flows in the positive Z direction, whereas the subsequent bias flux 128_2 flows in the negative Z direction. Similarly, the directions of the radial bias fluxes also alternate from pole assembly to pole assembly along the rotational axis: the bias flux 128_1 flows outwards in the pole assembly 110_1 then bias fluxes 128_1 and 128_2 flow together radially inwards in the pole assembly 110_2, and the bias flux 128_2 flows again radially outwards in the pole assembly 110_3. This is equivalent to saying that magnetic poles of the assemblies alternate along the rotational axis: South-North-South for the subsequent assemblies 110_1, 110_2 and 110_3.

Because the radial magnetic pole assembly 110_2 accommodates two magnetic bias fluxes 128_1 and 128_2, it may be two times wider in the axial direction than either the first or the last radial magnetic pole assemblies 110_1 and 110_2 respectively, each of which accommodates only one bias flux: 128_1 and 128_2 respectively.

Each radial magnetic pole 118_1a through 118_1d, 118_2a through 118_2d or 118_3a through 118_3d is equipped with a control coil 132_1a through 132_1d, 132_2a through 132_2d, or 132_3a through 132_3d, respectively. The coils are adapted to produce magnetic fluxes in the plurality of radial magnetic control circuits defined by the actuator target 108, which is a part of the body 104, and the plurality of radial poles within each pole assembly magnetically coupled to the actuator target 108. Mechanism of producing radial forces by different radial pole assemblies 110_1, 110_2 or 110_3 is essentially identical except for polarities of the control currents, which would be the same for the assemblies 110_1 and 110_3 but opposite for the assembly 110_2 due to different directions of the bias fluxes within the assembly. FIG. 1B illustrates mechanism of producing radial force in the radial magnetic pole assembly 110_2.

When the body 104 is centrally positioned and there are no currents in the radial control windings 132_2a through 132_2d, the bias flux densities under each pole 118_2a through 118_2d are equal because of the symmetrical nature of the system. Therefore, there is no radial force produced on the body 104. By energizing some of the radial control windings, 132_2a through 132_2d, the flux distribution may be altered so as to develop a radial force 102. For example, FIG. 1B shows windings 132_2a and 132_2c energized with control currents 134_2a and 134_2c, respectively. These currents produce radial control flux 136_2. The excitation coils may be individually energized, energized in unison, or some combination thereof to produce a control magnetic flux that produces a radial force 102 on the body 104 of sufficient magnitude and direction, as well as location relative to the body.

In the radial air gap 122_2a, control flux 136_2 adds to the magnetic bias fluxes 128_1 and 128_2, whereas in the radial air gap 122_2c, radial control fluxes 136_2 subtracts from the magnetic bias fluxes 128_1 and 128_2. Due to the higher resulting net magnetic flux density in the radial air gap 122_2a compared to the radial air gap 122_2c, radial electromagnetic force $F_Y$ 102_2 acts on the actuator target 108 and, consequently, on the body 104. In FIG. 1B this force $F_Y$ 102_2 is directed upward.

Continuing with FIG. 1B, the portion of the electromagnetic force $F_Y$ 102_2 exerted on actuator target 108 by the upper pole 118_2a associated with winding 132_2a can be calculated as $$F_{rad1} = \frac{1}{2\mu_0}(B0_{rad} + B1_{rad})^2.$$

$A_{rad}$, where $B0_{rad}$ is the density of the combined bias fluxes 128_1 and 128_2 in radial gap 122_2a, $B1_{rad}$ is the density of the radial control flux 136_2 in the radial gap 122_2a, and $A_{rad}$ is the projection of the pole surface adjacent to the radial air gap 122_2a on a plane normal to the pole axis (Y axis as illustrated in FIG. 1B).

Similarly, the electromagnetic force exerted on actuator target 108 by the lower poles 118_2c associated with winding 134_2b can be calculated as:

$$F_{rad2} = \frac{1}{2\mu_0}(B0_{rad} - B1_{rad})^2 \cdot A_{rad}.$$

The net radial force exerted on actuator target 108 by the radial magnetic pole assembly 110_2 will then be:

$$F_{rad} = F_{rad1} - F_{rad2}$$
$$= \frac{A_{rad}}{2\mu_0}\{(B0_{rad} + B1_{rad})^2 - (B0_{rad} - B1_{rad})^2\}$$
$$= 2\frac{A_{rad}}{\mu_0}B0_{rad}B1_{rad}$$

If radial control currents 134_2a and 134_2b are equal to a radial control current $I_{rad}$, the radial control magnetic flux density $B1_{rad}$ will be proportional to the radial control current $I_{rad}$, and, consequently, the radial force $F_{rad}$ will be proportional to $I_{rad}$. Although illustrated and described above in the Y direction, the same features apply in the X direction. Therefore, this implementation allows the electromagnetic actuator 100 to produce bidirectional electromagnetic forces along two radial axes, designated in FIG. 1B as X 180 and Y 182.

FIG. 1C illustrates generating a radial force 102_1 in the radial magnetic pole assembly 110_1. The difference from FIG. 1B is that directions of the radial control currents 134_1a and 134_1b may be reversed compared to the currents 134_2a and 134_2b in FIG. 1B in order to have force 102_1 directed in the same way as the force 102_2 in FIG. 1B because the direction of the bias flux 128_1 in the radial magnetic pole assembly 110_1 is opposite to the direction of the bias flux in the radial magnetic pole assembly 110_2. The control current directions in the magnetic pole assembly 110_3 would be identical to these in the magnetic pole assembly 110_1 shown on FIG. 1A because the bias fluxes directions are identical.

The actuator target 108 can be composed of electrical steel laminations electrically isolated from each other and stacked together in the axial direction in order to minimize eddy currents that can be induced if the body 104 rotates about its axis 106.

As can be learned from FIGS. 1A through 1C the bias flux polarity in this design does not change around the rotor circumference at any given axial position. In particular, FIG. 1B shows that the combined bias flux 128_1 and 128_2 is directed inwards in every pole 118_2a through 118_2d of the radial magnetic pole assembly 110_2. Similarly, FIG. 1C shows that the bias flux 128_1 is directed outward in every pole 118_1a through 118_1d of the radial magnetic pole assembly 110_1. The bias flux distribution in the radial magnetic pole assembly 110_3 is identical to the assembly 110_1. In certain instances, having the same bias flux polarity around the circumference of the actuator target at any given axial position results in lower rotational losses than in, for example, heteropolar actuators. As an example for comparison, FIG. 2A illustrates the structure and operational principle of a heteropolar actuator 200, discussed here with no intention of admitting to the prior art.

Figure 2A:
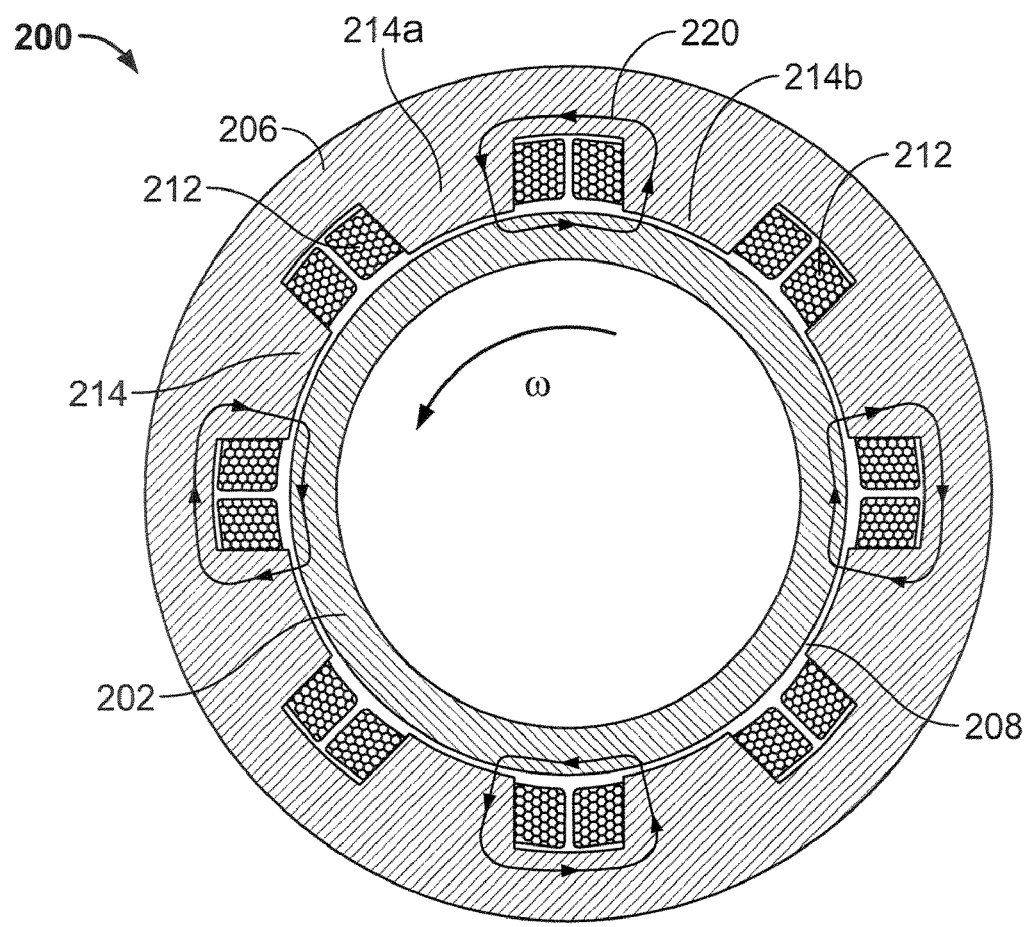
FIG. 2A is an axial cross-sectional schematic of an example heteropolar actuator showing a bias flux distribution.

The heteropolar actuator 200 shown in FIG. 2A consists of an actuator target 202 mounted on the rotor and a stator element 206 having a plurality of pole members 214 located in proximity to the actuator target 202 and separated from it by an air gap 208. Pole members 214a and 214b that face the actuator target 202 are separated from each other by slots with electrical coils 212 around each pole 214. The coils 212 may be energized with constant bias currents to produce bias fluxes 220 flowing between two adjacent poles (e.g., poles 214a and 214b). The bias fluxes are needed to maintain linear relationships between forces and control currents injected in the coils in addition to the bias currents.

Figure 2B:
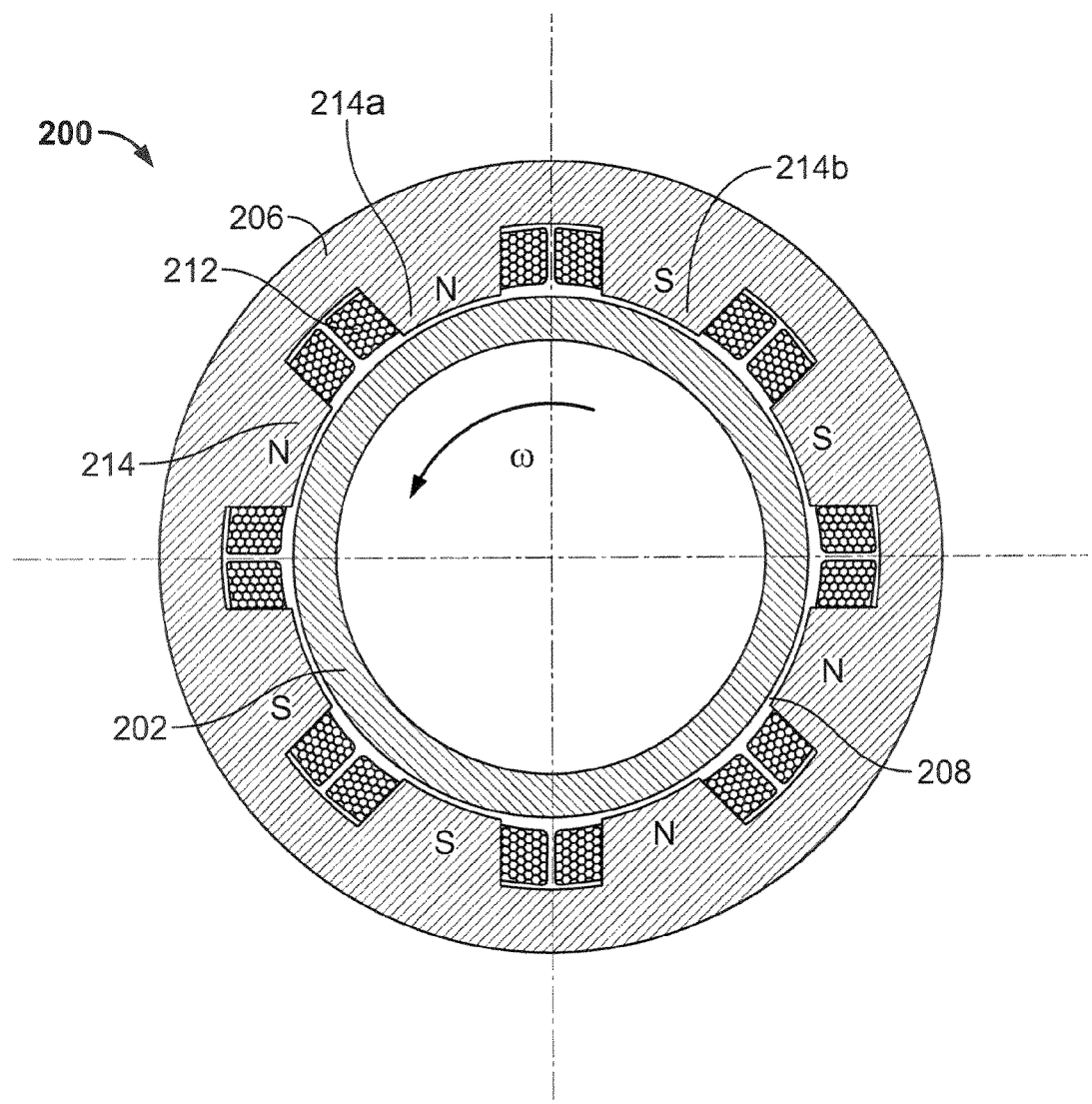
FIG. 2B is an axial cross-sectional schematic of the heteropolar actuator of FIG. 2A showing the pole polarity distribution pattern.
Figure 2C:
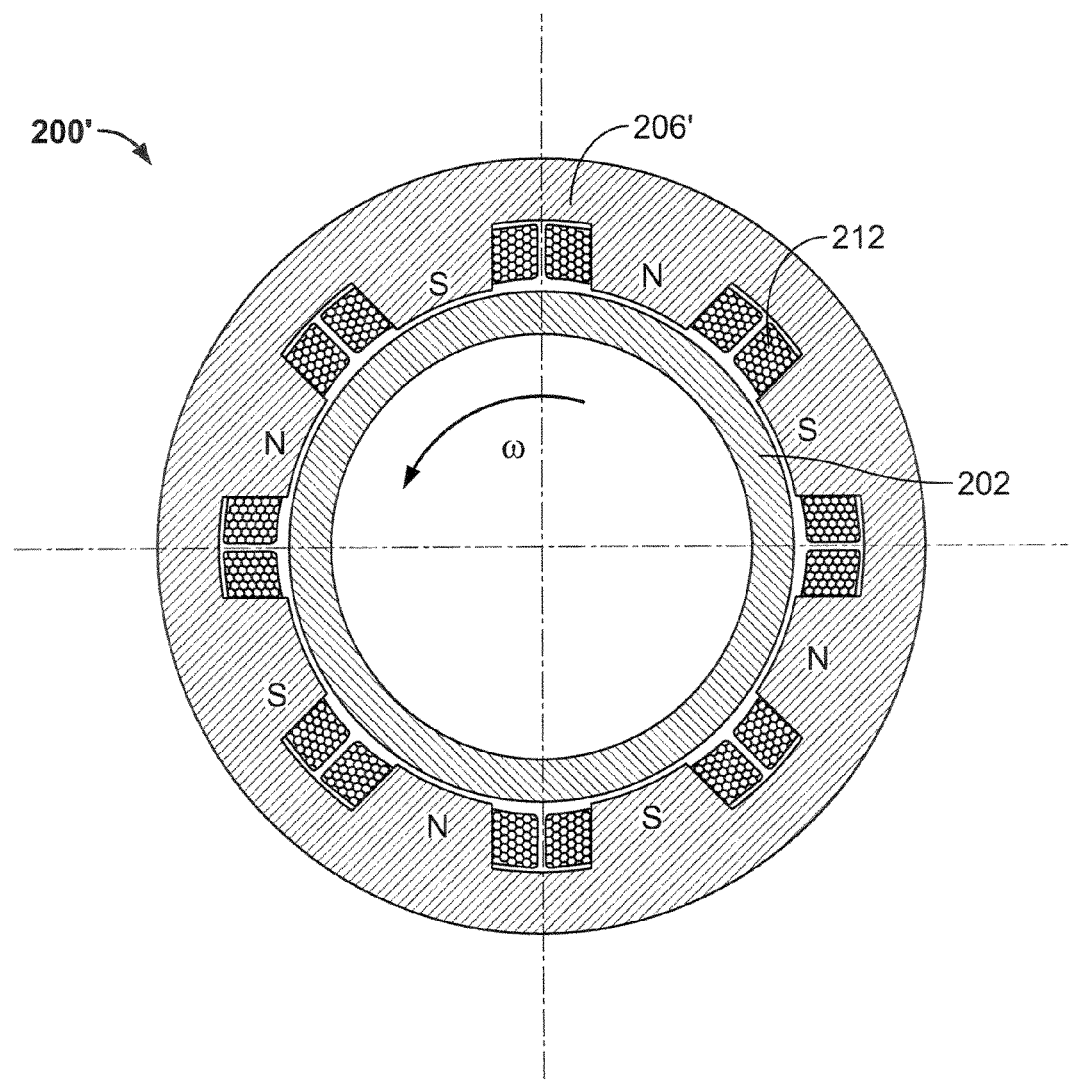
FIG. 2C is an axial cross-sectional schematic of another example heteropolar actuator showing an alternative pole polarity distribution pattern.
Figure 2D:
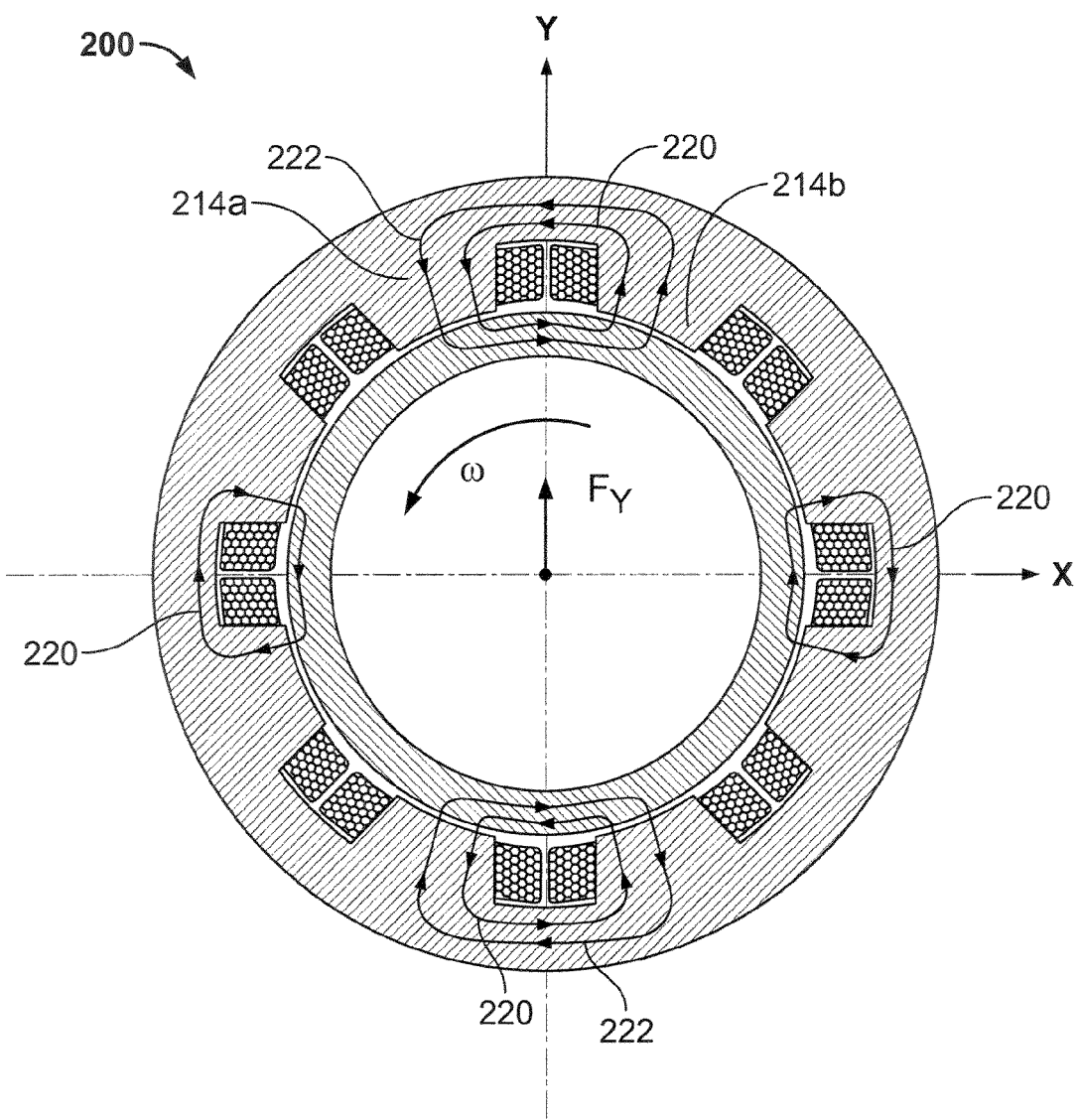
FIG. 2D is an axial cross-sectional schematic of the heteropolar actuator of FIGS. 2A-B showing the generation of a radial force in the +Y direction.

Since the magnetic field lines are closed, if the bias flux 220 enters the actuator target 202 at some point, it exits it at another point. In the heteropolar actuators shown in FIGS. 2A-D, where the magnetic flux lines are contained in the same radial plane, the polarity of the pole members 214 may vary along the rotor circumference. Depending on the mutual orientation of the bias currents in the neighboring winding, different patterns of the pole polarities are possible. FIGS. 2B-C show two such patterns with the patterns shown in FIG. 2B corresponding the bias flux directions shown in FIG. 2A. When a rotor supported by a heteropolar bearing spins, it sees alternating polarities of the magnetic field. Even though the actuator target 202 mounted on the rotor could be made laminated, there still will be eddy currents induced in it, resulting in noticeable rotational losses. In addition to eddy currents, remagnetization of the rotor material exposed to alternating magnetic field will further increase the rotational losses.

In addition to lower rotational losses, homopolar actuator designs such as shown in FIG. 1A have an advantage of an easy integration of permanent magnets into the design which can be used to generate bias magnetic fields instead of current-carrying coils used in FIGS. 2A-C. The use of permanent magnets may minimize the resistive losses associated with the current in a coil. In addition, fewer terminal wires would be needed compared to the heteropolar design of FIGS. 2A-C if the latter uses a separate coil to generate a bias flux or a power rating of an external source of the current in the control coil would be smaller compared to one of the heteropolar design of FIGS. 2A-C if the latter uses a single coil to generate both the bias and the control fluxes. The reduction of wires and/or current source power rating may simplify the actuator construction and improve reliability. The use of permanent magnet bias may also result in a smaller and nearly constant negative stiffness (i.e., the rate at which the destabilizing pulling radial force, which is unavoidable in the presence of a bias field, changes with the rotor offset from the equilibrium position).

Figure 3:
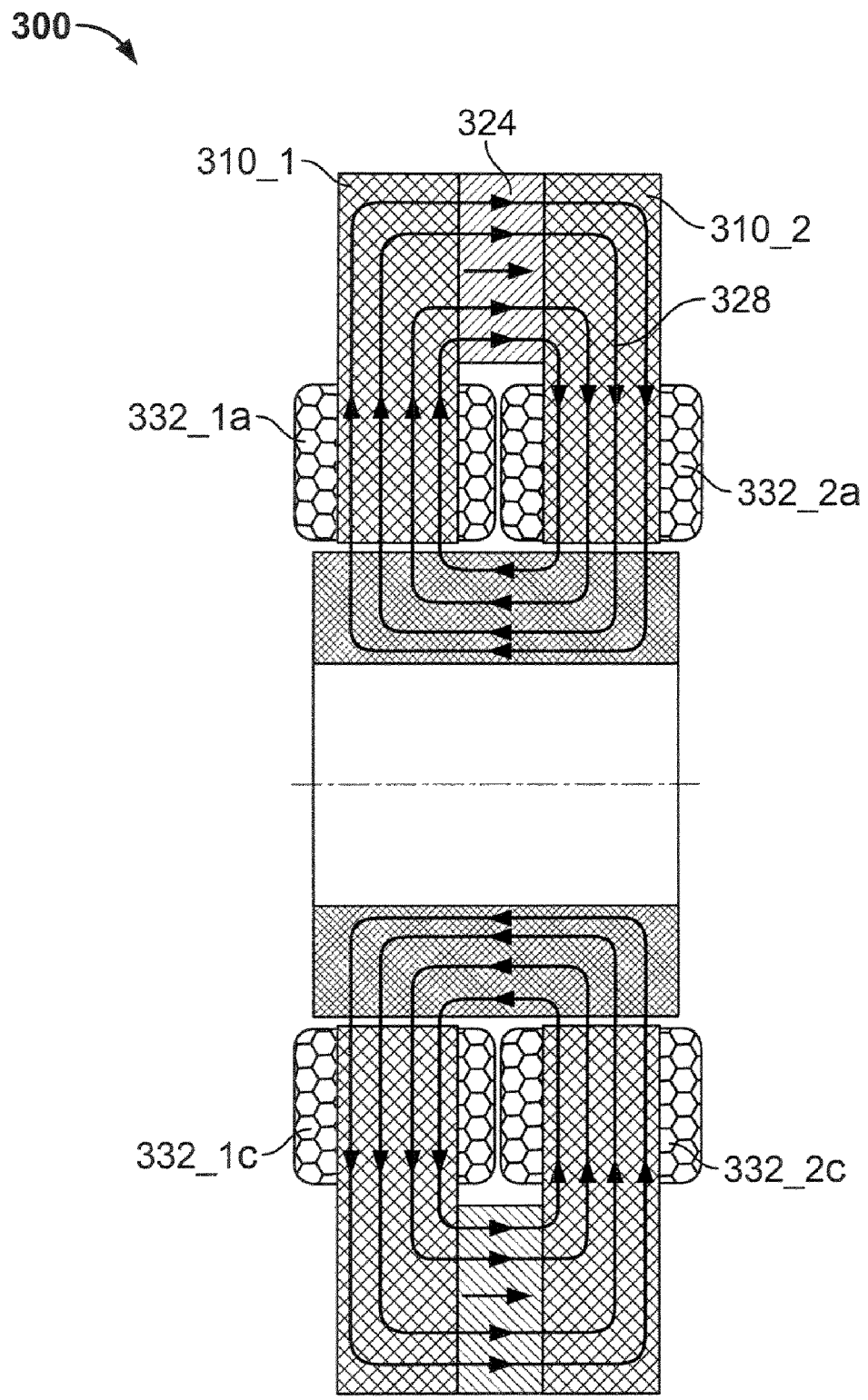
FIG. 3 is a side cross-sectional schematic of an example low-aspect-ratio homopolar actuator.

FIG. 3 shows a conventional homopolar radial magnetic actuator that includes two radial magnetic pole assemblies 310_1 and 310_2 similar to the radial magnetic pole assemblies 110_1, 110_2 and 110_3 in FIG. 1A and a magnet 324 used to generate bias magnetic field 328. A mechanism of producing radial force by radial magnetic pole assemblies 310_1 and 310_2 is identical to producing force with radial magnetic pole assemblies 110_1, 110_2 and 110_3 in FIGS. 1A-C. In both actuators shown in FIG. 3 and FIGS. 1A-C, the polarity of the bias magnetic flux does not change around the rotor circumference at any given axial position. The high-aspect-ratio actuator shown in FIGS. 1A through 1C would be shorter axially than two separate actuators of FIG. 3, would have fewer wire terminals since the control coils 132_2a through 132_2d of the radial magnetic poles each replace two control coils such as 332_1a that would be needed if two separate actuators shown in FIG. 3 were used, and also would produce a more energy efficient design since resistance of any of the control coils 132_2a and 132_2c would be less than the combine resistance of two individual control coils it would replace.

Figure 4A:
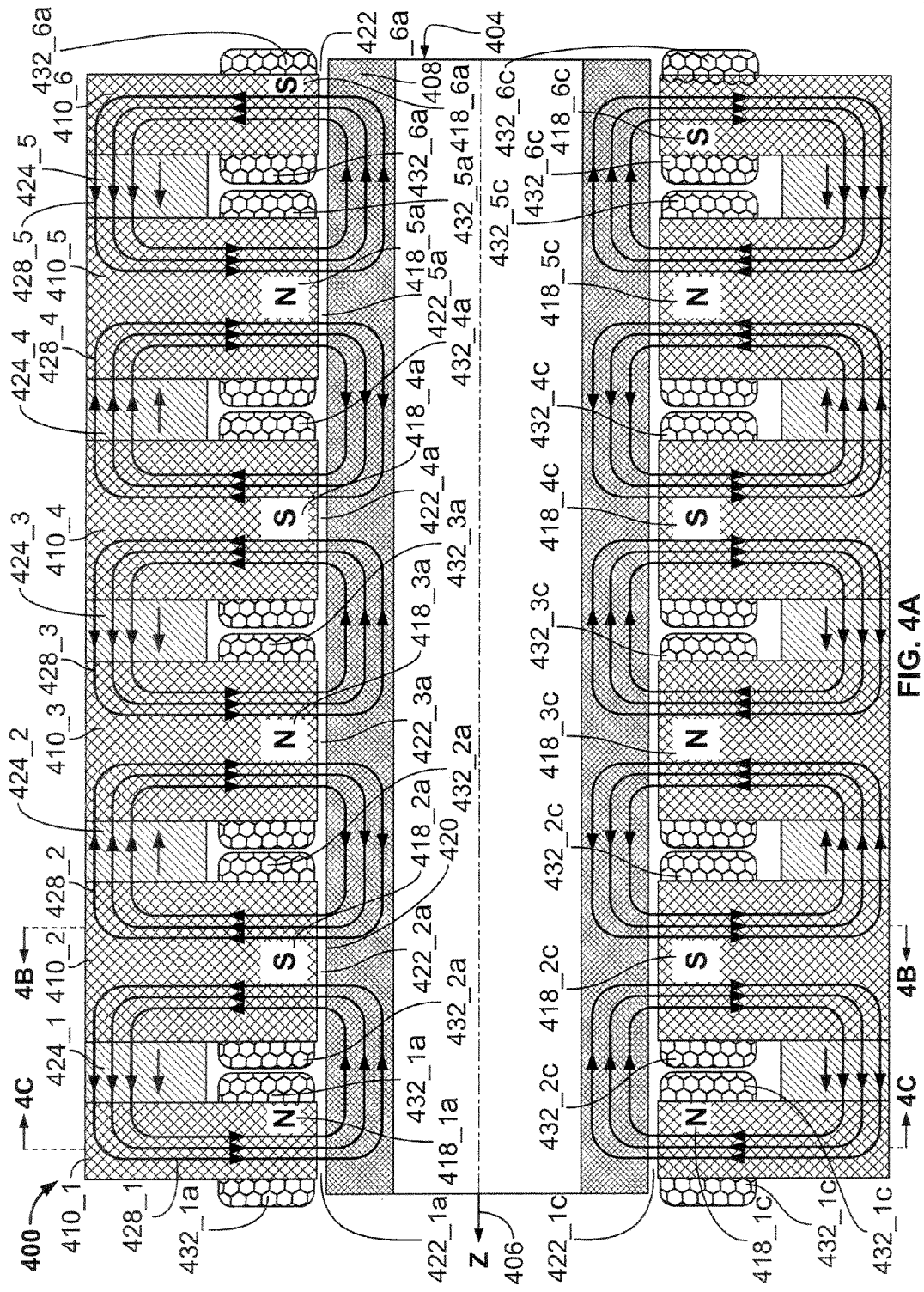
FIG. 4A is a side cross-sectional schematic of an embodiment of a high-aspect-ratio homopolar actuator with a plurality of radial magnetic pole assemblies.
Figure 4B:
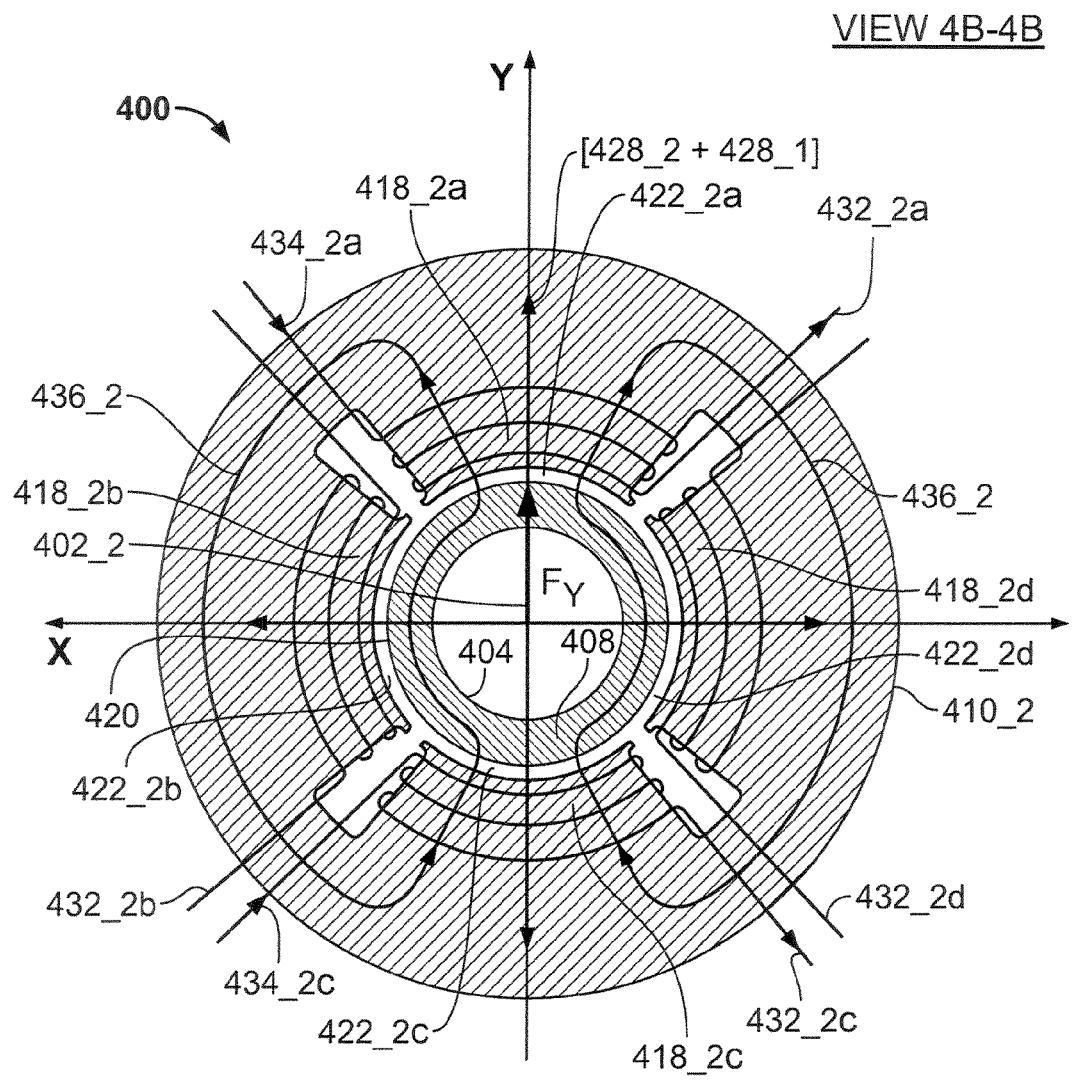
FIG. 4B is an axial cross-sectional schematic of the high-aspect-ratio homopolar actuator of FIG. 4A taken along view 4B-4B.
Figure 4C:
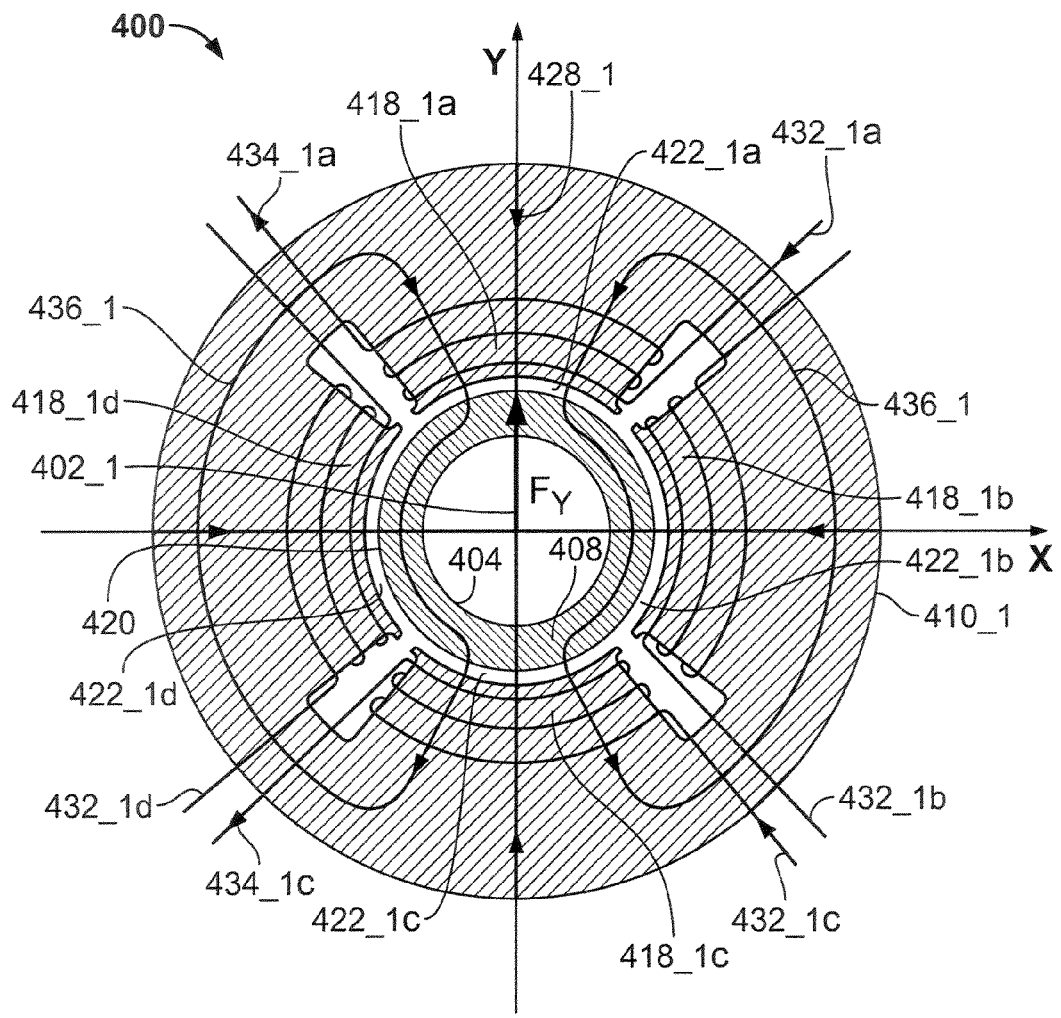
FIG. 4C is an axial cross-sectional schematic of the high-aspect-ratio homopolar actuator of FIG. 4A taken along view 4C-4C.

Furthermore, an arrangement shown in FIGS. 1A through 1C opens a way for stacking up any number of radial magnetic pole assemblies, such as 110_2, in a single unit with magnetic polarities of the bias fields alternating from assembly to assembly, as shown in FIGS. 4A through 4C. The actuator 400 shown in FIGS. 4A through 4C has a plurality of radial magnetic pole assemblies 410_1 through 410_6 distributed along the rotational axis 406 at some distances from each other. Each radial magnetic pole assembly includes a plurality of radial poles. For example, the radial magnetic pole assembly 410_2 includes radial magnetic poles 418_2a through 418_2d adjacent the lateral facing surface 420 of the body 404 and separated from it by radial gaps 422_2a through 422_2d. More details are given in FIG. 4B, which is an axial cross-sectional schematic of the high-aspect-ratio homopolar actuator of FIG. 4A taken along view 4B-4B. Radial magnetic poles 418_2a through 418_2d are adapted to communicate magnetic fluxes with the lateral facing surface 420 of the body 404 through radial gaps 422_2a-422_2d. The body 404 and the plurality of radial poles 418_2a through 418_2d within the pole assembly 410_2 are magnetically coupled and define a plurality of radial magnetic control circuits.

Similarly, FIG. 4C, which is an axial cross-sectional schematic of the high-aspect-ratio homopolar actuator of FIG. 4A taken along view 4C-4C, shows that the radial magnetic pole assembly 410_1 has four radial magnetic poles 418_1a through 418_1d adjacent the lateral facing surface 420 of the body 404 and separated from it by radial gaps 422_1a through 422_1d.

Returning to FIG. 4A, axially magnetized permanent magnets 424_1 through 424_5 installed between the radial magnetic pole assemblies 410_1 through 410_6 serve as magnetic means inducing bias magnetic fluxes 428_1 through 428_5 flowing radially within each radial magnetic pole assembly and axially within the actuator target 408, which is a part of the body 404, between any two neighboring radial magnetic pole assemblies so that directions of radial bias magnetic fluxes within radial magnetic pole assemblies and directions of the axial magnetic fluxes between neighboring radial magnetic pole assemblies alternate in the axial direction. For example, the bias flux 428_1 induced by the magnet 424_1 flows radially inwards in the radial magnetic pole assembly 410_1, radially outwards in the magnetic pole assembly 410_2, and axially in the negative Z direction when flowing from the radial magnetic pole assembly 410_1 to the radial magnetic pole assembly 410_2 within the actuator target 408. The bias flux 428_2 induced by the magnet 424_2 flows radially inwards in the radial magnetic pole assembly 410_3, radially outwards in the magnetic pole assembly 410_2, and axially in the positive Z direction when flowing from the radial magnetic pole assembly 410_3 to the radial magnetic pole assembly 410_2 within the actuator target 408. Note that the direction of the axial bias flux within the actuator target 408 alternates along the rotational axis: the bias flux 428_1 flows in the negative Z direction, the bias flux 428_2 flows in the positive Z direction, the bias flux 428_3 flows again in the negative Z direction, and so on. Similarly, the directions of the radial bias fluxes also alternate from pole assembly to pole assembly along the rotational axis: the bias flux 428_1 flows inwards in the pole assembly 410_1, the bias fluxes 428_1 and 428_2 flow radially outwards in the pole assembly 410_2, the bias fluxes 428_2 and 428_3 flow again radially inwards in the next pole assembly 410_3, and so on. This is equivalent to saying that magnetic poles of the assemblies alternate along the rotational axis: North-South-North and so on for the subsequent radial pole assemblies 410_1, 410_2, 410_3 and so on. Each radial magnetic pole (e.g., radial magnetic poles 418_1a-418_1d and 418_2a-418_2d) is equipped with a control coil (e.g., coil 432_1a-432_1d and 432_2a-432_2d, respectively). The coils are adapted to produce magnetic fluxes in the plurality of radial magnetic control circuits defined by the actuator target 408, which is a part of the body 404, and the plurality of radial poles within each pole assembly magnetically coupled to the actuator target 408. Mechanism of producing radial forces by different radial pole assemblies 410_1 through 410_6 is essentially identical except for polarities of the control currents, which would be identical for every other assembly, but opposite for the adjacent assemblies. Control windings 432_1a-432_6d around each radial magnetic pole 418_1a-418_6d can produce control magnetic flux through the poles, as discussed further below. Though not shown in FIG. 4A, it is to be understood that a radial magnetic pole coinciding with 418_6d and a winding around it coinciding with 432_6d are contemplated in a similar manner as the radial poles and windings discussed in FIGS. 4B-C. For example, FIG. 4B illustrates mechanism of producing radial force in the radial magnetic pole assembly 410_2.

When the body 404 is centrally positioned and there are no currents in the radial control windings 432_2a though 432_2d, the bias flux densities under each pole 418_2a through 418_2d are equal because of the symmetrical nature of the system. Therefore, there is no radial force produced on the body 404. By energizing some of the radial control windings 432_2a through 432_2d, the flux distribution may be altered so as to develop a radial force. For example, FIG. 4B shows windings 432_2a and 432_2c energized with control currents 434_2a and 434_2c, respectively. These currents produce radial control flux 436_2.

In the radial air gap 422_2a control flux 436_2 adds to the magnetic bias fluxes 428_1 and 428_2 (shown on FIG. 4A), whereas in the radial air gap 422_2c radial control flux 436_2 subtracts from the magnetic bias fluxes 428_1 and 428_2. Due to the higher resulting net magnetic flux density in the radial air gap 422_2a compared to the radial air gap 422_2c, radial electromagnetic force $F_Y$ 402_2 acts on the actuator target 408 and, consequently, on the body 404. In FIG. 4B, this force $F_Y$ 402_2 is directed upward.

FIG. 4C illustrates generating a radial force 402_1 in the radial magnetic pole assembly 410_1. The difference from FIG. 4B is that direction of the radial control currents 434_1a and 434_1c may be reversed compared to the currents 434_2a and 434_2c in FIG. 4B in order to have force 402_1 directed in the same way as the force 402_2 in FIG. 4B because the direction of the bias flux 428_1 in the radial magnetic pole assembly 410_1 is opposite to the direction of the bias flux in the radial magnetic pole assembly 410_2. The control current direction in magnetic pole assemblies 410_3 and 410_5 in FIG. 4A would be identical to these in the magnetic pole assembly 410_1 because the bias fluxes directions are identical. Similarly, the control current directions in magnetic pole assemblies 410_4 and 410_6 would be identical to these in the magnetic pole assembly 410_2.

Figure 8:
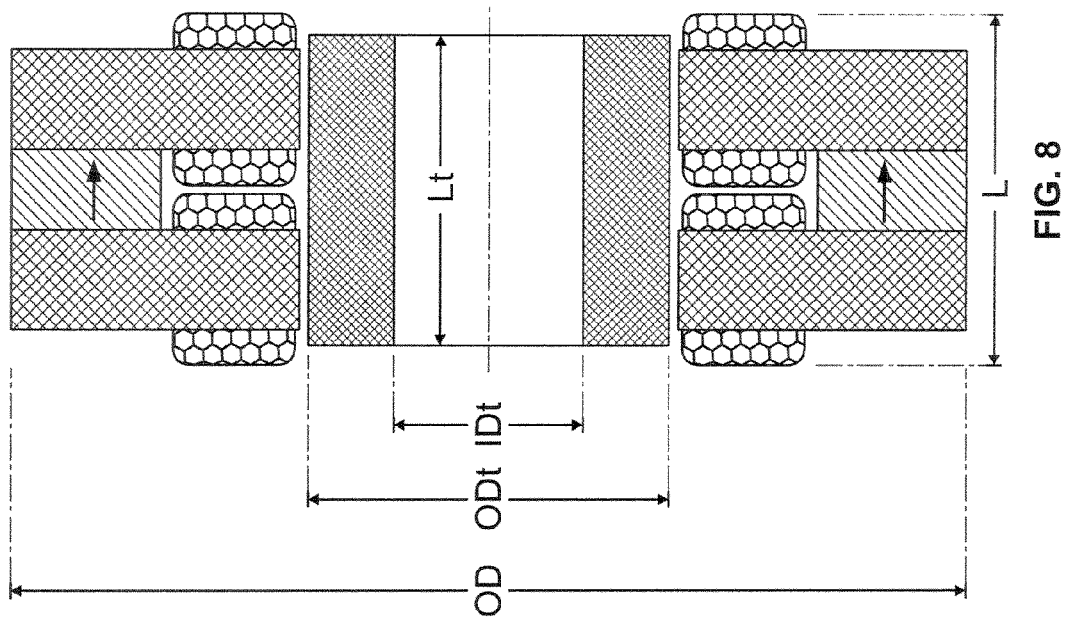
FIG. 8 is a side cross-sectional schematic of an example low-aspect-ratio homopolar actuator showing the dimensions for calculating the aspect ratio.
Figure 7:
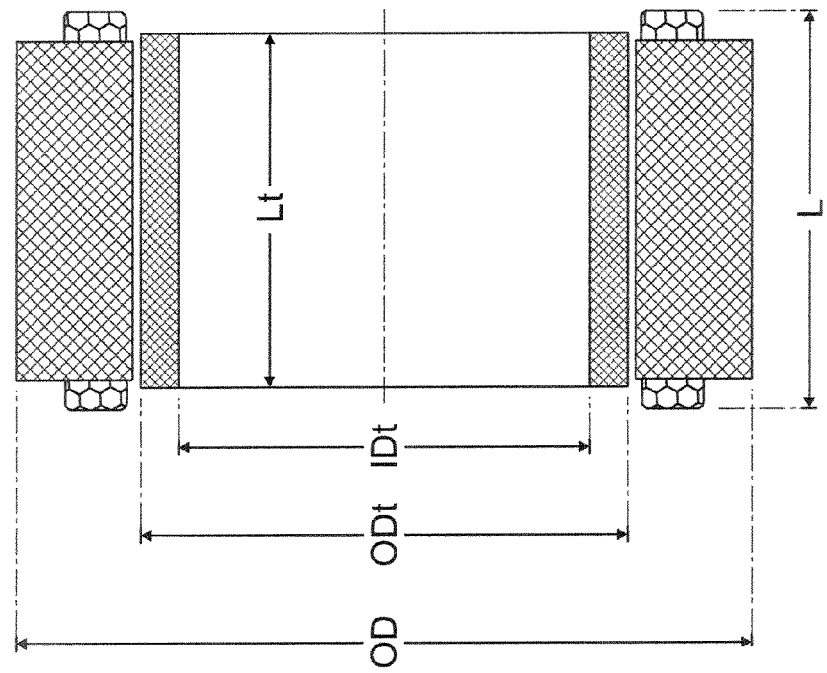
FIG. 7 is a side cross-sectional schematic of an example heteropolar actuator showing the dimensions for calculating the aspect ratio.

Using the arrangement shown in FIGS. 4A through 4C allows one to overcome a drawback of the design shown in FIG. 3, such as a low aspect ratio of the actuator target and of the overall actuator envelope. The definitions of the actuator aspect ratios are clarified by FIGS. 7 and 8 for the heteropolar and homopolar actuators respectively: the actuator target aspect ratio is defined as Lt/(ODt−IDt) and the overall actuator envelope aspect ratio is defined as L/(OD−IDt). The main factors responsible for low aspect ratios in the homopolar radial magnetic actuator design shown in FIG. 3 are a) a large pole area of the magnet 324 is needed to generate sufficient bias magnetic flux 328, and b) a large cross-sectional area of the actuator target defined as $$\frac{\pi}{4}(OD_t^2 - ID_t^2)$$

is needed to carry bias magnetic flux 328 axially between the radial magnetic pole assemblies 310_1 and 310_2. The first factor results in a large assembly outer diameter (OD), whereas the second factor is responsible for a low target ID ($ID_t$). In contrast, in the heteropolar magnetic actuator 200 shown in FIGS. 2A through 2D, there are no axial magnetic fluxes, both control fluxes 222 and bias fluxes 220 are tangential and divided into small portions along the circumference, each portion of the flux running only a short distance between two neighboring poles (e.g., poles 214a and 214b). By changing the number of poles in a heteropolar actuator, its aspect ratios can be adjusted, and, in particular, it can be made very high. In contrast, the aspect ratios of the homopolar radial actuator 300 cannot be changed much and typically are relatively low. The fixed aspect ratio of the homopolar actuator 300 often makes its integration into a machine difficult because the aspect ratio of the envelope available for the actuator may not be changed. Furthermore, having an optimal aspect ratio of the actuator target is very important in rotating machinery since it affects dynamics of the rotor on which the actuator target is mounted. In contrast to the actuator 300 shown in FIG. 3, the aspect ratio of the actuator 400 shown in FIGS. 4A through 4C can be adjusted by changing the number of the radial magnetic pole assemblies. In this case, similar to heteropolar actuator 200, the entire bias flux needed to achieve the required load capacity in the actuator 400 shown in FIGS. 4A-C is divided into a series of smaller fluxes 428_1 through 428_5 running only a short distance between two neighboring radial pole assemblies (e.g., assemblies 410_1 and 410_2). The difference is that in the heteropolar actuator 200, the fluxes are divided in the circumferential direction, which results in alternating polarities of the poles in this direction and causes rotational losses as discussed above, whereas in the design 400 in FIGS. 4A through 4C, poles alternate in the axial direction while preserving the homopolar structure in the tangential direction with associated low rotational losses.

Figure 5A:
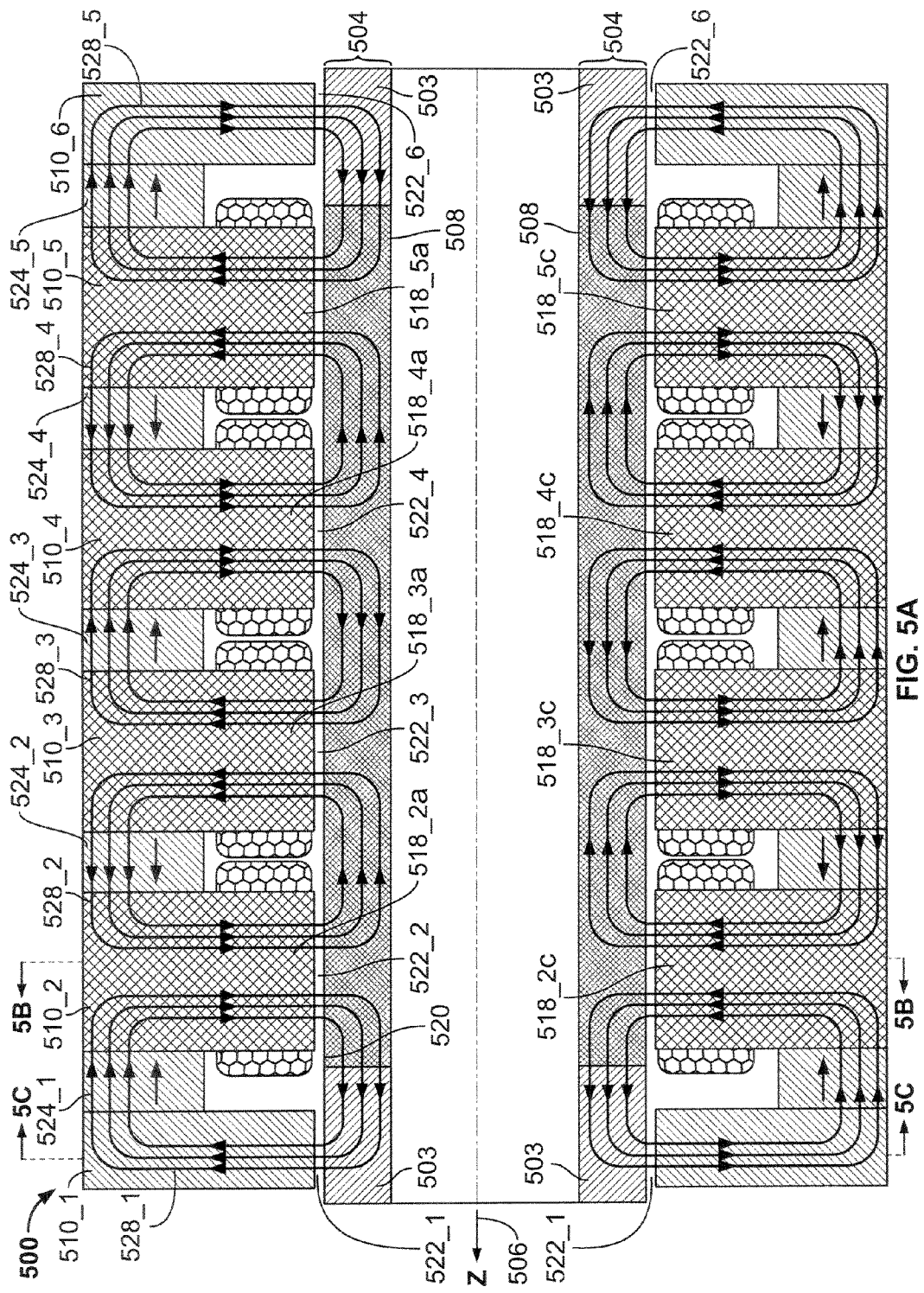
FIG. 5A is a side cross-sectional schematic showing an embodiment of a high-aspect-ratio homopolar actuator with end poles used to terminate a chain of the radial magnetic pole assemblies.
Figure 5B:
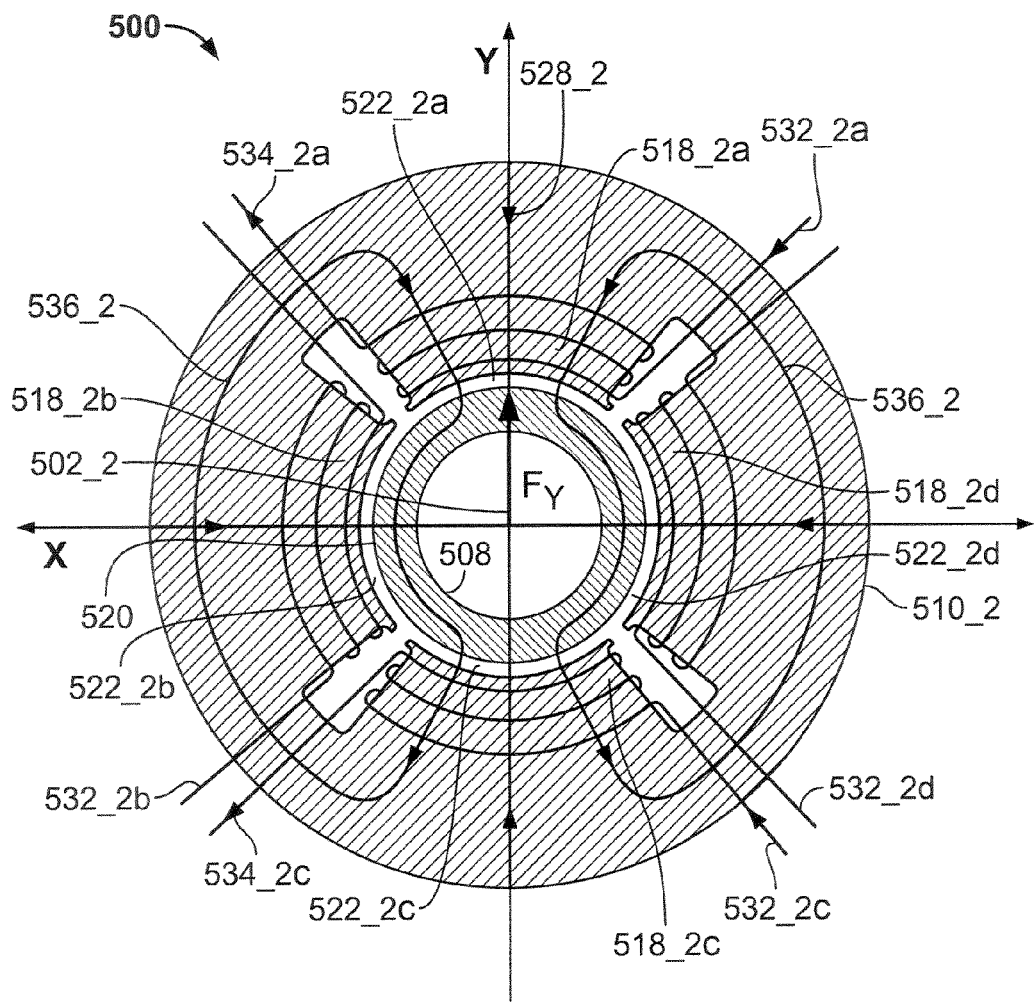
FIG. 5B is an axial cross-sectional schematic of the high-aspect-ratio homopolar actuator of FIG. 5A taken along view 5B-5B.
Figure 5C:
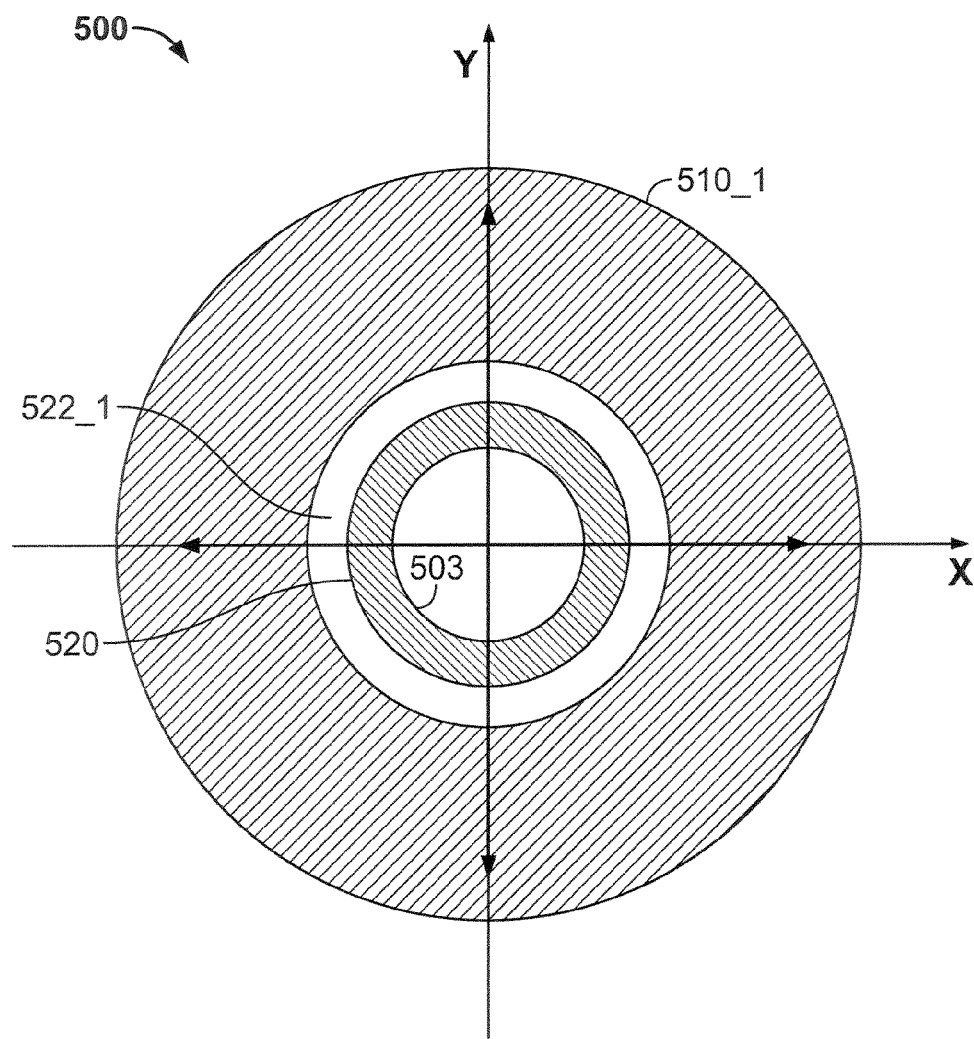
FIG. 5C is an axial cross-sectional schematic of the high-aspect-ratio homopolar actuator of FIG. 5A taken along view 5C-5C.

In some applications, it might be beneficial to terminate a chain of radial magnetic pole assemblies with non-laminated, soft-magnetic end-poles having no slots and no windings, as illustrated in FIGS. 5A through 5C. The radial magnetic pole assemblies 510_2 through 510_5 shown in FIG. 5A through 5C are similar to the radial magnetic pole assemblies 410_1 through 410_6 in FIGS. 4A through 4C. Each of the radial magnetic pole assemblies 510_2 through 510_5 includes a plurality of radial poles, adjacent the lateral facing surface 520 of the body 504 and separated from it by radial gaps. For example, the magnetic pole assembly 510_2 includes radial magnetic poles 518_2a through 518_2d adjacent the lateral facing surface 520 of the body 504 and separated from it by radial gaps 522_2a through 522_2d (also shown in FIG. 5B). More details are given in FIG. 5B, which is an axial cross-sectional schematic of the high-aspect-ratio homopolar actuator for FIG. 5A taken along view 5B-5B. Radial magnetic poles 518_2a through 518_2d are adapted to communicate magnetic fluxes with the lateral facing surface 520 of the body 504 through radial gaps 522_2a-522_2d. The body 504 and the plurality of radial poles 518_2a through 518_2d within the pole assembly 510_2 are magnetically coupled and define a plurality of radial magnetic control circuits.

Referring to FIG. 5A, axially magnetized permanent magnets 524_2 through 524_4 installed between the radial magnetic pole assemblies 510_2 through 510_5 serve as magnetic means inducing bias magnetic fluxes 528_2 through 528_4 flowing radially within each radial magnetic pole assembly and axially between any two neighboring radial magnetic pole assemblies within the actuator target 508, which is a part of the body 504, so that directions of radial bias magnetic fluxes within radial magnetic pole assemblies and directions of the axial magnetic fluxes between neighboring radial magnetic pole assemblies alternate in the axial direction. For example, the bias flux 528_2 induced by the magnet 524_2 flows radially inwards in the radial magnetic pole assembly 510_2, radially outwards in the magnetic pole assembly 510_3, and axially in the negative Z direction when flowing from the radial magnetic pole assembly 510_2 to the radial magnetic pole assembly 510_3 within the actuator target 508. The bias flux 528_3 induced by the magnet 524_3 flows radially inwards in the radial magnetic pole assembly 510_4, radially outwards in the magnetic pole assembly 510_3, and axially in the positive Z direction when flowing from the radial magnetic pole assembly 510_4 to the radial magnetic pole assembly 510_3 within the actuator target 508. Note that the direction of the axial bias flux within the actuator target 508 alternates along the rotational axis: the bias flux 528_2 flows in the negative Z direction, the bias flux 528_3 flows in the positive Z direction, the bias flux 528_4 flows again in the negative Z direction and so on. Similarly, the directions of the radial bias fluxes also alternate from pole assembly to pole assembly along the rotational axis: the bias flux 528_2 flows inwards in the pole assembly 510_2, the bias fluxes 528_2 and 528_3 flow radially outwards in the pole assembly 510_3, the bias fluxes 528_3 and 528_4 flow again radially inwards in the next pole assembly 510_4, and so on. In other words, the magnetic poles of the assemblies alternate along the rotational axis: North-South-North, and so on, for the subsequent radial pole assemblies 510_2, 510_3, 510_4, etc. Control windings (e.g., 532_1a-532_6d in FIG. 5A) around each radial magnetic pole 518_1a-518_6d can produce control magnetic flux through the poles, as discussed further below. Though not shown in FIG. 5A, it is to be understood that a radial magnetic pole coinciding with 518_6d and a winding around it coinciding with 532_6d are contemplated in a similar manner as the radial poles and windings discussed in FIGS. 5B-C.

Referring to FIG. 5B, each radial magnetic pole 518_2a through 518_5d within radial magnetic pole assemblies 510_2 through 510_5 is equipped with a control coil 532_2a through 532_5d, respectively. These coils are adapted to produce magnetic fluxes in the plurality of radial magnetic control circuits defined by the actuator target 508, which is a part of the body 504, and the plurality of radial poles within each pole assembly magnetically coupled to the actuator target 508. Mechanism of producing radial forces by different radial pole assemblies 510_2 through 510_5 shown in FIG. 5A is essentially identical except for polarities of the control currents, which would be identical for the every other assembly but opposite for the adjacent assemblies. For example, FIG. 5B illustrates mechanism of producing radial force in the radial magnetic pole assembly 510_2.

When the body 504 is centrally positioned and there are no currents in the radial control windings 532_2a through 532_2d, the bias flux densities under each pole 518_2a through 518_2d are equal because of the symmetrical nature of the system. Therefore, there is no radial force produced on the body 504. By energizing some of the radial control windings, for example 532_2a and 532_2c, the flux distribution may be altered so as to develop a radial force. For example, FIG. 5B shows windings 532_2a and 532_2c energized with control currents 534_2a and 534_2c, respectively. These currents produce radial control flux 536_2.

In the radial air gap 522_2a control flux 536_2 adds to the magnetic bias fluxes 528_1 (shown in FIG. 5A) and 528_2, whereas in the radial air gap 522_2c radial control fluxes 536_2 subtracts from the magnetic bias fluxes 528_1 and 528_2. Due to the higher resulting net magnetic flux density in the radial air gap 522_2a compared to the radial air gap 522_2c, radial electromagnetic force $F_Y$ 502_2 acts on the actuator target 508 and, consequently, on the object 504. In FIG. 5B this force $F_Y$ 502_2 is directed upward.

In addition to radial magnetic pole assemblies 510_2 through 510_5 the actuator 500 shown in FIG. 5A through 5C also includes the first end pole 510_1 and the second end pole 501_6, each circumferentially arranged around the rotational axis 506. For example, each of the first end pole 510_1 and the second end pole 501_6 may be concentric to the rotational axis. The first end pole 510_1 is installed next to the first end radial magnetic pole assembly 510_2 and separated from it by some distance. Similarly, the second end pole 510_6 is installed next to the second end radial magnetic assembly 510_5 and separated from it by some distance. A permanent magnet 524_1 induces bias flux 528_1 which flows radially in the first end pole 510_1 in the direction opposite to the direction of fluxes 528_1 and 528_2 in the neighboring radial magnetic pole assembly 510_2 and into a portion of the body 504 across air gap 522_1. Similarly, a permanent magnet 524_5, induces bias flux 528_5 which flows radially in the second end pole 510_6 in the direction opposite the direction of fluxes 528_4 and 528_5 in the neighboring radial magnetic pole assembly 510_5.

FIG. 5C illustrates a construction and a function of first end pole 510_1. A construction and a function of the second end pole 510_6 shown on FIG. 5A are identical. Since these poles do not have a plurality of poles and control winding, there are no control fluxes in them and they cannot be used to produce a controllable force on the body 504. However, they serve as return paths for the bias magnetic fluxes 528_1 and 528_5. Further, the region 503 of the body 504 adjacent the end poles 510_1 and 510_6 may be of non-laminated, soft magnetic material, while the actuator target 508 may be stacked laminations.

Figure 6:
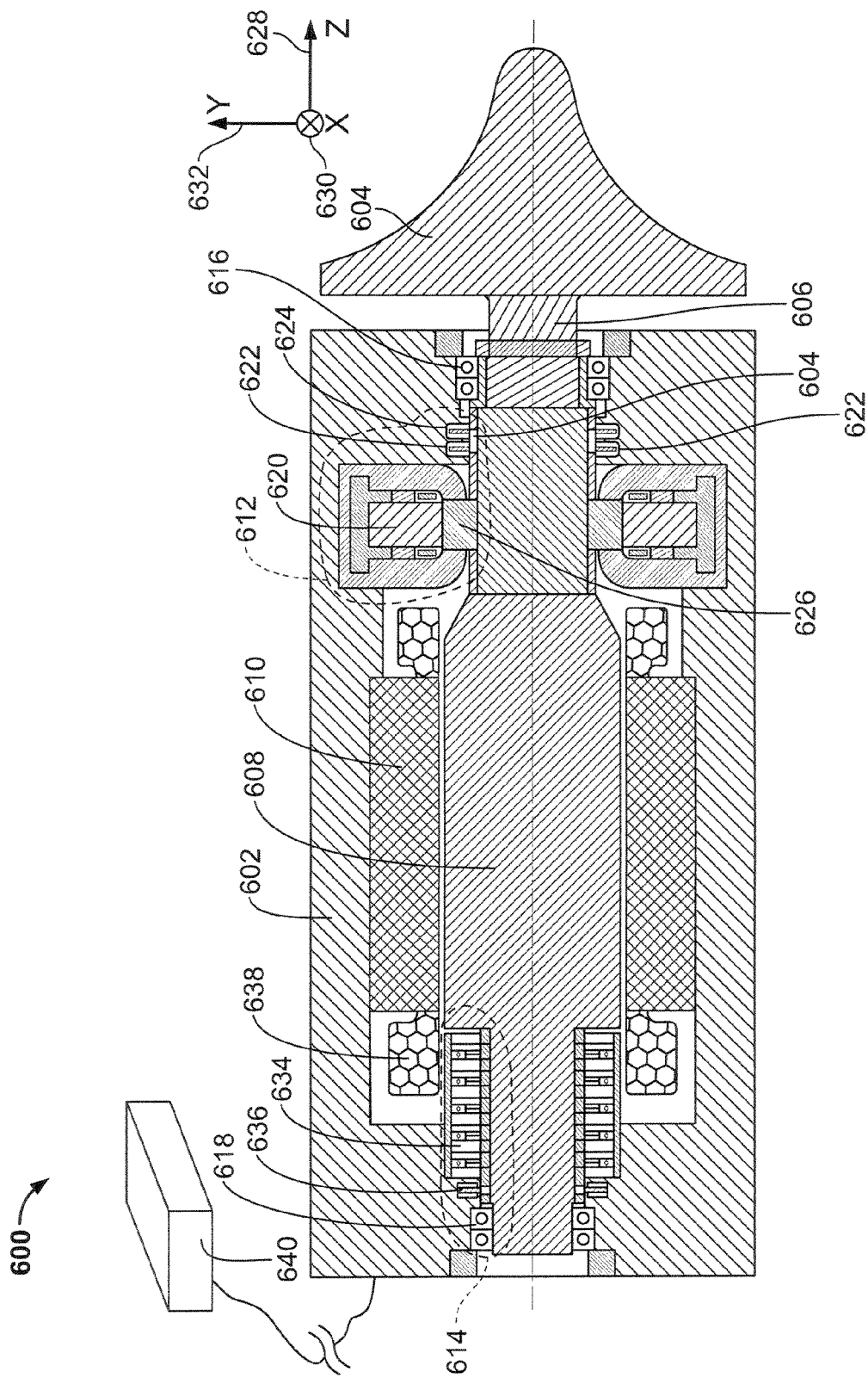
FIG. 6 is a side cross-sectional schematic illustrating an embodiment of the high-aspect-ratio homopolar actuator adapted to an electric machine system in accordance with the present disclosure.

In some aspects, the high-aspect-ratio homopolar actuator of the present disclosure (for example, actuator 400 of FIG. 4A, or, alternatively, actuator 500 of FIG. 5A) may be utilized as part of an Active Magnetic Actuator (AMB) system to support an object without a mechanical contact. FIG. 6 is a side cross sectional schematic of an example of using an AMB system in an electric rotational machine 600. The rotational electric machine 600 can be, for example, an electric compressor consisting of an electric motor 602 driving an impeller 604 mounted directly on the motor shaft 606. The electric motor 602 has a rotor 608 and a stator 610. Alternatively the impeller 604 can be driven by a flow of gas or liquid and spin the rotor 608 attach to it through the shaft 606. In this case the motor 602 can be used as a generator which would convert the mechanical energy of the rotor 608 into electricity. In embodiments, the rotor 608 of the electric machine 600 can be supported radially and axially without mechanical contact by means of front and rear radial AMBs 612 and 614. The front AMB 612 provides an axial suspension of the entire rotor 608 and a radial suspension of the front end of the rotor, whereas the rear AMB 614 provides only radial suspension of the rear end of the rotor 608. When the AMBs 612 and 614 are not working, the rotor rests on the mechanical backup bearings 616 and 618. The front backup bearing 616 provides the axial support of the entire rotor 608 and a radial support of the rotor front end, whereas the rear backup bearing 618 provides only radial support of the rear end of the rotor 608. There are sufficient radial clearances between the inner diameters of the mechanical backup bearings 616, 618, and the outer diameters of the rotor portions interfacing with those bearings to allow the rotor 608 to be positioned radially without touching the backup bearings 616, 618 when the AMBs 612 and 614 are activated. Similarly, there are sufficient axial clearances between the backup bearings 616, 618 and the portions of the rotor 608 interfacing with those bearings to allow the rotor 608 to be positioned axially without touching the backup bearings 616 and 618 when the AMBs 612 and 614 are activated.

The front AMB 612 consists of an electromagnetic actuator 620, radial position sensors 622, axial position sensor 624, and control electronics 640. The electromagnetic actuator 620 is capable of exerting radial and axial forces on the actuator target 626 firmly mounted on the rotor 608. The axial force is the force in the direction of Z-axis 628 and the radial forces are forces in the direction of X-axis 630 (directed into the page) and the direction of Y-axis 632. The actuator has three sets of coils corresponding to each of the axes and the forces are produced when the corresponding coils are energized with control currents produced by control electronics 640. The position of the front end of the rotor in space is constantly monitored by non-contact position sensors 622 and 624. The non-contact position sensors 622 monitor radial position of the rotor whereas the position sensor 624 monitors the axial position of the rotor.

Signals from the position sensors 622 and 624 are input into the control electronics 640, which generates currents in the control coils of the electromagnetic actuator 620 whenever it finds that the rotor is deflected from the desired position such that these currents produce forces pushing the rotor back to the desired position.

The rear AMB 614 consists of a high-aspect-ratio electromagnetic actuator 634 consistent with the present disclosure, radial non-contact position sensors 636, and control electronics 640. Because it features a higher ratio between the length and the diameter than a conventional radial homopolar actuator, it can be placed under the motor endturns 638. This reduces length of the machine 600 and improves its rotordynamics. Rear AMB 614 functions identical to the front AMB 620 except that it does not control the axial position of the rotor 608 because this function is already performed by the front AMB 612. Correspondingly, the high-aspect-ratio actuator 634 may not be able to produce controllable axial force and there may be no axial position sensor. The radial portion of the front AMB actuator 620 is shown of a conventional homopolar type similar to the one presented in FIG. 3. The complete actuator 620 can exert both axial and radial forces on the actuator target 626.

What is claimed is:

1. An electromagnetic actuator comprising:
a body having a rotational axis;
at least three radial magnetic pole assemblies, each circumferentially arranged around the rotational axis, separated from the body by radial gaps, and distributed along the rotational axis at fixed distances from each other, each radial magnetic pole assembly comprising:
a plurality of radial poles adjacent and spaced apart from a lateral facing surface of the body and configured to communicate magnetic flux with the lateral facing surface of the body, and
the plurality of radial poles of the respective radial magnetic pole assembly and the body magnetically coupled and defining a radial magnetic control circuit;
an excitation coil around each of the plurality of radial poles configured to produce control magnetic flux in the radial magnetic control circuits; and
a plurality of magnetic elements distributed with alternating polarities along the rotational axis, each of the magnetic elements residing between adjacent radial magnetic pole assemblies and configured to produce bias magnetic fluxes flowing radially within each adjacent radial magnetic pole assembly and axially in the body between adjacent radial magnetic pole assemblies.

2. The actuator of claim 1 wherein two of the at least three radial magnetic pole assemblies are first and second end radial magnetic pole assemblies, the first and second end radial magnetic pole assemblies residing at opposite ends of the electromagnetic actuator of claim 1, the actuator further comprising:
a first end pole circumferentially arranged around the rotational axis, separated from the body by radial gaps and adjacent the first end radial magnetic pole assembly; and
a first end magnetic element configured to produce bias magnetic flux flowing radially within the first end pole in a direction opposite to the bias magnetic flux in the first end radial magnetic pole assembly.

3. The actuator of claim 2 further comprising:
a second end pole circumferentially arranged around the rotational axis, separated from the body by radial gaps and adjacent the second end radial magnetic pole assembly; and
a second end magnetic element configured to produce bias magnetic flux flowing radially within the second end pole in a direction opposite to the bias magnetic flux in the second end radial magnetic pole assembly.

4. The actuator of claim 1 wherein the body comprises a low reluctance target, the target adapted to communicate magnetic flux.

5. The actuator of claim 1 wherein the magnetic fluxes entering the lateral surface of the body exert radial forces on the body.

6. The actuator of claim 5 wherein the radial forces are proportional to the magnetic fluxes in the radial magnetic control circuits.

7. The actuator of claim 1 wherein the magnetic element comprises a permanent magnet.

8. The actuator of claim 7 wherein the permanent magnet comprises at least one of a neodymium iron boron magnet or a samarium cobalt magnet.

9. The actuator of claim 7 wherein the permanent magnet comprises at least one of an axially magnetized permanent magnet or a radially magnetized permanent magnet.

10. The actuator of claim 1 wherein the control magnetic flux is produced by a control current in the excitation coil, the control current controllable to affect a total magnetic flux in the control magnetic circuit.

11. The actuator of claim 1 wherein the excitation coil around each of the plurality of radial poles is energizable with a control current to produce distinct control fluxes in the radial magnetic control circuits of the respective radial magnetic pole assemblies.

12. A method for exerting a radial force on a body, the body configured to rotate about a rotational axis, the method comprising:
communicating a first bias magnetic flux between a first radial pole assembly, the body, and a second radial pole assembly, the first and second radial pole assemblies spaced apart from one another along the rotational axis, the first and second radial pole assemblies each circumferentially arranged around the rotational axis, and the first and second radial pole assemblies separated from the body by an air gap, the first bias magnetic flux propagating through the body in a direction parallel to the rotational axis;
communicating a second bias magnetic flux between the second radial pole assembly, the body, and a third radial pole assembly, the second and third radial pole assemblies spaced apart from one another along the rotational axis, the second and third radial pole assemblies each circumferentially arranged around the rotational axis, and the second and third radial pole assemblies separated from the body by an air gap, the second radial bias magnetic flux propagating through the body in a direction parallel to the rotational axis and opposite from the first bias magnetic flux;
communicating a first radial control magnetic flux between the first radial pole assembly and the body, the first radial control magnetic flux propagating between a first radial pole of the first pole assembly, the body, and a second pole of the first pole assembly, the first radial control magnetic flux propagating in a radial direction orthogonal to the rotational axis;
communicating a second radial control magnetic flux between the second radial pole assembly and the body, the second radial control magnetic flux propagating between a first radial pole of the second pole assembly, the body, and a second pole of the second pole assembly, the second radial control magnetic flux propagating in a radial direction orthogonal to the rotational axis opposite from the first radial control magnetic flux; and
communicating a third radial control magnetic flux between the third radial pole assembly and the body, the third radial control magnetic flux propagating between a first radial pole of the third pole assembly, the body, and a second pole of the third pole assembly, the third radial control magnetic flux propagating in a radial direction orthogonal to the rotational axis opposite from the second radial control magnetic flux.

13. The method of claim 12 wherein communicating the first, second, and third radial control magnetic flux further comprises:
energizing a control coil around each of the first and second radial poles of the first, second, and third radial pole assemblies with a control current.

14. The method of claim 12 further comprising varying a control current to affect a total magnetic flux in the air gaps between the first, second, and third radial pole assemblies and the body.

15. A system comprising:
a body having a rotational axis configured to move relative to a base;
an electromagnetic actuator sub-assembly coupled to the base comprising:
three radial magnetic pole assemblies, each circumferentially arranged around the rotational axis, separated from the body by radial gaps, and distributed along the rotational axis at fixed distances from each other, each radial magnetic pole assembly comprising:
a plurality of radial poles adjacent and spaced apart from a lateral facing surface of the body and configured to communicate magnetic flux with the lateral facing surface of the body, and
the plurality of radial poles of the respective radial magnetic pole assembly and the body magnetically coupled and defining a radial magnetic control circuit,
a control coil around each of the plurality of radial poles configured to produce control magnetic flux in the radial magnetic control circuits, and
a plurality of magnetic elements distributed with alternating polarities along the rotational axis, each of the magnetic elements residing between adjacent radial magnetic pole assemblies and configured to produce bias magnetic fluxes flowing radially within each adjacent radial magnetic pole assembly and axially in the body between adjacent radial magnetic pole assemblies;
one or more position sensors configured to sense a position of the body; and
at least one control electronics package configured to control the magnetic flux in the radial magnetic control circuits.

16. The system of claim 15 wherein the body is coupled to a driven load, the driven load comprising at least one of a flywheel, a compressor, a generator, or an expander.

17. The system of claim 15 wherein the body is coupled to a driver, the driver comprising at least one of a motor, an engine, or a turbine.

18. The system of claim 15 wherein the body is a rotor and the base is a stator of an electric machine.

19. The system of claim 15 wherein the electronic control package is configured to control the magnetic flux in the radial magnetic control circuits by energizing the control coil around each of the plurality of radial poles with a control current.

20. The system of claim 19 wherein the electronic control package is further configured to energize the control coils around each of the plurality of radial poles with a control current to produce distinct control fluxes in the radial magnetic control circuits of the respective radial magnetic pole assemblies.

* * * * *